(12) United States Patent
Purkayastha et al.

(10) Patent No.: US 11,985,553 B2
(45) Date of Patent: May 14, 2024

(54) TECHNIQUES FOR INTER-SYSTEM HANDING OVER FROM A STANDALONE TO A NON-STANDALONE MODE

(71) Applicant: QUALCOMM Incorporated, San Diego, CA (US)

(72) Inventors: Punyaslok Purkayastha, San Diego, CA (US); Xipeng Zhu, San Diego, CA (US); Ozcan Ozturk, San Diego, CA (US); Gavin Bernard Horn, La Jolla, CA (US); Luis Fernando Brisson Lopes, Swindon (GB); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 17/248,464

(22) Filed: Jan. 26, 2021

(65) Prior Publication Data
US 2021/0235334 A1 Jul. 29, 2021

Related U.S. Application Data

(60) Provisional application No. 62/967,266, filed on Jan. 29, 2020.

(51) Int. Cl.
*H04W 36/00* (2009.01)
*H04W 40/36* (2009.01)
(Continued)

(52) U.S. Cl.
CPC ... *H04W 36/0069* (2018.08); *H04W 36/0022* (2013.01); *H04W 40/36* (2013.01); *H04W 76/11* (2018.02); *H04W 84/18* (2013.01)

(58) Field of Classification Search
CPC ......... H04W 36/0011; H04W 36/0016; H04W 36/0022; H04W 36/0055; H04W 36/0069;
(Continued)

(56) References Cited

U.S. PATENT DOCUMENTS 10,368,384 B2  7/2019  Ali et al.
2019/0182732 A1  6/2019  Wei et al.
(Continued)

FOREIGN PATENT DOCUMENTS

CN  110140377 A  8/2019
CN  110521274 A  11/2019
(Continued)

OTHER PUBLICATIONS

CATT : "TP for TS37.340 BLCR Conditional SN Addition & Change Procedure", 3GPP Draft, 3GPP TSG RAN WG3#106, R3-196727, 3rd Generation Partnership Project (3GPP), Mobile Competence Centre, 650, Route Des Lucioles, F-06921 Sophia-Antipolis Cedex, France, vol. RAN WG3, No. Reno, NV, USA, Nov. 18, 2019-Nov. 22, 2019, Nov. 9, 2019 (Nov. 9, 2019), XP051823910, 28 Pages, Retrieved from the Internet: URL: https://ftp.3gpp.org/tsg_ran/WG3_lu/TSGR3_106/Docs/R3-196727.zip. R3-196727-TP for—TS37.340 BLCR Conditional SN Addition & Change Procedure.doc [retrieved on Nov. 9, 2019] p. 12-p. 13; figures 10.3.2-2.

(Continued)

*Primary Examiner* — Matthew W Genack
(74) *Attorney, Agent, or Firm* — Dalei Dong; Harrity & Harrity, LLP

(57) ABSTRACT

Various aspects of the present disclosure generally relate to wireless communication. In some aspects, a master node (MN) may receive information indicating one or more candidate target secondary nodes (SNs) for a multi radio access technology dual connectivity (MR-DC) handover of
(Continued)

a user equipment (UE), wherein the information indicates that the one or more candidate target SNs are associated with direct forwarding paths with a source radio access network (RAN) node of the UE; select a target SN from the one or more candidate target SNs based at least in part on the received information; and perform the MR-DC handover of the UE, wherein the selected target SN is different than the source RAN node of the UE, and wherein a configuration of the MR-DC handover is based at least in part on a direct forwarding path between the selected target SN and the source RAN node.

31 Claims, 15 Drawing Sheets

(51) Int. Cl.
*H04W 76/11* (2018.01)
*H04W 84/18* (2009.01)
(58) Field of Classification Search
CPC ..... H04W 40/02; H04W 40/34; H04W 40/36; H04W 76/10; H04W 76/11; H04W 76/15; H04W 76/20; H04W 84/18
See application file for complete search history.

(56) References Cited

U.S. PATENT DOCUMENTS

| | | |
|---|---|---|
| 2020/0053815 A1 | 2/2020 | Teyeb et al. |
| 2020/0178140 A1 | 6/2020 | Xu et al. |
| 2020/0267631 A1* | 8/2020 | Yilmaz ................ H04W 48/08 |

FOREIGN PATENT DOCUMENTS

| | | | |
|---|---|---|---|
| WO | 2018227452 A1 | 12/2018 | |
| WO | WO-2019066628 A1 * | 4/2019 | .......... H04W 12/033 |
| WO | 2020096396 A1 | 5/2020 | |

OTHER PUBLICATIONS

CATT: et al., "Discussion on Inter-System Handover from EN-DC to SA", 3GPP Draft, 3GPP TSG-RAN WG3 #106, R3-197030, 3rd Generation Partnership Project (3GPP), Mobile Competence Centre, 650, Route Des Lucioles, F-06921 Sophia-Antipolis Cedex, France, vol. RAN WG3, No. Reno, USA, Nov. 18, 2019-Nov. 22, 2019, Nov. 8, 2019 (Nov. 8, 2019 ), XP051820683, 2 Pages, Retrieved from the Internet: URL: https://ftp.3gpp.org/tsg_ran/WG3_lu/TSGR3_106/Docs/R3-197030.zip. R3-197030.doc [retrieved on Nov. 8, 2019] p. 1-p. 2.
International Search Report and Written Opinion—PCT/US2021/070084—ISA/EPO—dated May 11, 2021.
Qualcomm Incorporated: "(TP for NR BL CR for TS 37.340): Inter-System Handover Between SA and NSA", 3GPP TSG-RAN3 #101, 3GPP Draft, R3-184683 Inter-System Handover Between SA and NSA, 3rd Generation Partnership Project (3GPP), Mobile Competence Centre, 650, Route Des Lucioles, F-06921 Sophia-Antipolis Cedex, France, vol. RAN WG3, No. Gothenburg, Sweden, Aug. 20, 2018-Aug. 24, 2018, Aug. 11, 2018 (Aug. 11, 2018), 4 Pages, XP051528030, Retrieved from the Internet: URL: http://www.3gpp.org/ftp/tsg%5Fran/WG3%5Flu/TSGR3%5F101/Docs/R3%2D184683%2Ezip [retrieved on Aug. 11, 2018] the whole document.

* cited by examiner

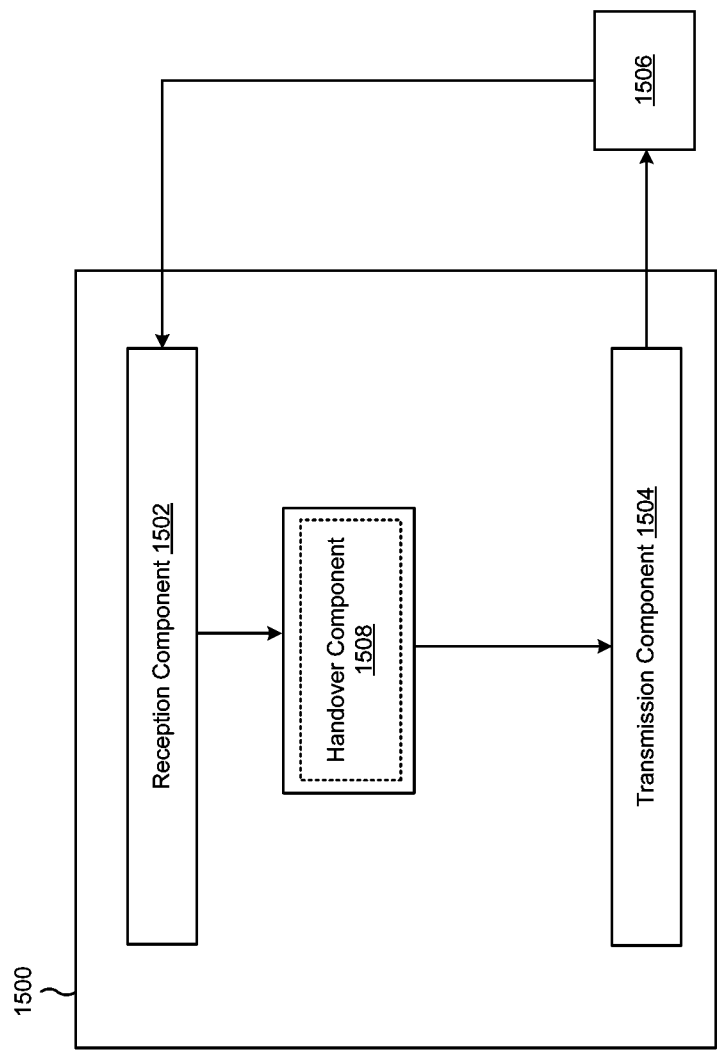

TECHNIQUES FOR INTER-SYSTEM HANDING OVER FROM A STANDALONE TO A NON-STANDALONE MODE

CROSS-REFERENCE TO RELATED APPLICATION

This Patent Application claims priority to U.S. Provisional Patent Application No. 62/967,266, filed on Jan. 29, 2020, entitled "TECHNIQUES FOR INTER-SYSTEM HANDING OVER FROM A STANDALONE TO A NON-STANDALONE MODE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for inter-system handing over from a standalone to a non-standalone mode.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a master node (MN), may include receiving handover information indicating a target secondary node (SN) for a multi radio access technology (multi-RAT) dual connectivity (DC) (MR-DC) handover of a user equipment (UE), wherein the handover information indicates that the target SN is a source radio access network (RAN) node of the UE, and wherein the MR-DC handover is an inter-system handover; selecting the source RAN node or another node as the target SN based at least in part on the handover information; and performing the MR-DC handover of the UE, wherein, when the selected target SN is different than the source RAN node of the UE, a configuration of the MR-DC handover is based at least in part on a direct forwarding path between the selected target SN and the source RAN node.

In a first aspect, when the source RAN node is the selected target SN, performing the MR-DC handover further comprises performing the MR-DC handover without configuring or performing data forwarding between the source RAN node and the MN.

In a second aspect, alone or in combination with the first aspect, the source RAN node is associated with a first core network and the MN is associated with a second core network different than the first core network.

In a third aspect, alone or in combination with one or more of the first and second aspects, the first core network is a 5G core network and the second core network is an evolved packet core.

In a fourth aspect, alone or in combination with one or more of the first through third aspects, the handover information is included in a handover request, and the handover information is received from the source RAN node via a core network device.

In a fifth aspect, alone or in combination with one or more of the first through fourth aspects, selecting the selected target SN further comprises selecting the source RAN node as the selected target SN.

In a sixth aspect, alone or in combination with one or more of the first through fifth aspects, process 600 includes requesting, from the selected target SN, at least one of information indicating whether there is a direct forwarding path between the selected target SN and the source RAN node, or one or more identifiers associated with the direct forwarding path.

In a seventh aspect, alone or in combination with one or more of the first through sixth aspects, process 600 includes receiving, from the selected target SN when there is a direct forwarding path between the selected target SN and the source RAN node, the one or more identifiers.

In an eighth aspect, alone or in combination with one or more of the first through seventh aspects, the handover information indicates a set of SNs associated with direct forwarding paths with the source RAN node, the selected target SN is selected from the set of SNs, and the one or more candidate target SNs include one or more radio access network nodes associated with cells that are candidate target primary secondary cells or special cells a secondary cell group associated with the selected target SN.

In a ninth aspect, alone or in combination with one or more of the first through eighth aspects, selecting the source RAN node or another node as the target SN further comprises selecting the target SN based at least in part on at least one of UE measurement information or the set of SNs, and the method further comprises requesting, from the selected target SN, at least one of information indicating whether there is a direct forwarding path between the selected target SN and the source RAN node, or one or more identifiers associated with the direct forwarding path; and receiving, from the selected target SN when there is a direct forwarding path between the selected target SN and the source RAN node, the one or more identifiers.

In a tenth aspect, alone or in combination with one or more of the first through ninth aspects, process 600 includes providing, to the selected target SN in connection with an interface setup procedure with the selected target SN, information indicating a set of RAN nodes associated with direct forwarding paths with the MN; and receiving, from the selected target SN in connection with the interface setup procedure, information indicating a set of RAN nodes associated with direct forwarding paths with the selected target SN, wherein the selected target SN is selected for the MR-DC handover based at least in part on the source RAN node being included in the set of nodes associated with direct forwarding paths with the selected target SN.

In an eleventh aspect, alone or in combination with one or more of the first through tenth aspects, the MR-DC handover comprises an E-UTRA-NR dual connectivity (EN-DC) handover.

In a twelfth aspect, alone or in combination with one or more of the first through eleventh aspects, the handover information includes information indicating an evolved packet system fallback of an Internet Protocol media subsystem (IMS) voice call, and selecting the source RAN node or the other node as the target SN is based at least in part on the information indicating the evolved packet system fallback of the IMS voice call.

In a thirteenth aspect, alone or in combination with one or more of the first through twelfth aspects, the handover information indicates that the target SN is a source RAN node of the UE.

In some aspects, a method of wireless communication, performed by a source RAN node, may include providing handover information indicating a target secondary node (SN) for a multi radio access technology (multi-RAT) dual connectivity (DC) (MR-DC) handover of a user equipment (UE), wherein the handover information indicates that the target SN is the source RAN node, and wherein the MR-DC handover is an inter-system handover; and performing the MR-DC handover to a master node (MN) and the selected target SN, wherein, when a selected target SN of the MR-DC handover is different than the source RAN node of the UE, the MR-DC handover is based at least in part on a direct forwarding path between the selected target SN and the source RAN node.

In a first aspect, the source RAN node is associated with a first core network and the MN is associated with a second core network different than the first core network.

In a second aspect, alone or in combination with the first aspect, the first core network is a 5G core network and the second core network is an evolved packet core.

In a third aspect, alone or in combination with one or more of the first and second aspects, the handover information is included in a handover required message transmitted to a core network device, and the handover information is provided to the MN via the core network device.

In a fourth aspect, alone or in combination with one or more of the first through third aspects, the source RAN node is the selected target SN.

In a fifth aspect, alone or in combination with one or more of the first through fourth aspects, the handover information indicates a set of SNs associated with direct forwarding paths with the source RAN node, and the source RAN node determines the set of SNs based at least in part on a UE measurement and based at least in part on a set of nodes associated with cells that are candidate target primary secondary cells (PSCells) or special cells of a secondary cell group associated with the selected target SN.

In a sixth aspect, alone or in combination with one or more of the first through fifth aspects, the MR-DC handover comprises an EN-DC handover.

In some aspects, a method of wireless communication, performed by a user equipment (UE), may include receiving a handover command indicating a selected target secondary node (SN) for a multi radio access technology (multi-RAT) dual connectivity (DC) (MR-DC) handover of the UE, wherein the selected target SN is selected from a set of target SNs including a source RAN node of the UE, and wherein the MR-DC handover is an inter-system handover; and performing the MR-DC handover to a master node (MN) and the selected target SN, wherein, when the selected target SN is different than the source RAN node of the UE, a configuration of the MR-DC handover is based at least in part on a direct forwarding path between the selected target SN and the source RAN node.

In a first aspect, when the source RAN node is the selected target SN, the MR-DC handover is performed without configuring or performing data forwarding between the source RAN node and the MN.

In a second aspect, alone or in combination with the first aspect, the source RAN node is associated with a first core network and the MN is associated with a second core network different than the first core network.

In a third aspect, alone or in combination with one or more of the first and second aspects, the first core network is a 5G core network and the second core network is an evolved packet core.

In a fourth aspect, alone or in combination with one or more of the first through third aspects, the source RAN node is the selected target SN.

In a fifth aspect, alone or in combination with one or more of the first through fourth aspects, the MR-DC handover comprises an EN-DC handover.

In some aspects, a method of wireless communication, performed by a master node (MN), may include receiving handover information indicating a target secondary node (SN) for a multi radio access technology (multi-RAT) dual connectivity (DC) (MR-DC) handover of a user equipment (UE), wherein the MR-DC handover is an inter-system handover; selecting the source RAN node or another node as the target SN based at least in part on the handover information; and performing the MR-DC handover of the UE, wherein, when the selected target SN is different than the source RAN node of the UE, a configuration of the MR-DC handover is based at least in part on a direct forwarding path between the selected target SN and the source RAN node.

In a first aspect, the handover information includes information indicating an evolved packet system fallback of an Internet Protocol media subsystem (IMS) voice call, and selecting the source RAN node or the other node as the target SN is based at least in part on the information indicating the evolved packet system fallback of the IMS voice call. In a second aspect, alone or in combination with the first aspect, the handover information indicates that the target SN is a source RAN node of the UE.

In some aspects, an MN for wireless communication may include a memory and one or more processors operatively coupled to the memory. The memory and the one or more processors may be configured to receive handover information indicating a target secondary node (SN) for a multi radio access technology (multi-RAT) dual connectivity (DC) (MR-DC) handover of a user equipment (UE), wherein the handover information indicates that the target SN is a source RAN node of the UE, and wherein the MR-DC handover is an inter-system handover; select the source RAN node or another node as the target SN based at least in part on the handover information; and perform the MR-DC handover of the UE, wherein, when the selected target SN is different than the source RAN node of the UE, a configuration of the MR-DC handover is based at least in part on a direct forwarding path between the selected target SN and the source RAN node.

In some aspects, a source RAN node for wireless communication may include a memory and one or more processors operatively coupled to the memory. The memory and the one or more processors may be configured to provide handover information indicating a target secondary node (SN) for a multi radio access technology (multi-RAT) dual connectivity (DC) (MR-DC) handover of a user equipment (UE), wherein the handover information indicates that the target SN is the source RAN node, and wherein the MR-DC handover is an inter-system handover; and perform the MR-DC handover to a master node (MN) and the selected target SN, wherein, when a selected target SN of the MR-DC handover is different than the source RAN node of the UE, the MR-DC handover is based at least in part on a direct forwarding path between the selected target SN and the source RAN node.

In some aspects, a UE for wireless communication may include a memory and one or more processors operatively coupled to the memory. The memory and the one or more processors may be configured to receive a handover command indicating a selected target secondary node (SN) for a multi radio access technology (multi-RAT) dual connectivity (DC) (MR-DC) handover of the UE, wherein the selected target SN is selected from a set of target SNs including a source RAN node of the UE, and wherein the MR-DC handover is an inter-system handover; and perform the MR-DC handover to a master node (MN) and the selected target SN, wherein, when the selected target SN is different than the source RAN node of the UE, a configuration of the MR-DC handover is based at least in part on a direct forwarding path between the selected target SN and the source RAN node.

In some aspects, an MN for wireless communication may include a memory and one or more processors operatively coupled to the memory. The memory and the one or more processors may be configured to receive handover information indicating a target secondary node (SN) for a multi radio access technology (multi-RAT) dual connectivity (DC) (MR-DC) handover of a user equipment (UE), wherein the MR-DC handover is an inter-system handover; select the source RAN node or another node as the target SN based at least in part on the handover information; and perform the MR-DC handover of the UE, wherein, when the selected target SN is different than the source RAN node of the UE, a configuration of the MR-DC handover is based at least in part on a direct forwarding path between the selected target SN and the source RAN node.

In some aspects, a non-transitory computer-readable medium may store one or more instructions for wireless communication. The one or more instructions, when executed by one or more processors of an MN, may cause the one or more processors to receive handover information indicating a target secondary node (SN) for a multi radio access technology (multi-RAT) dual connectivity (DC) (MR-DC) handover of a user equipment (UE), wherein the handover information indicates that the target SN is a source RAN node of the UE, and wherein the MR-DC handover is an inter-system handover; select the source RAN node or another node as the target SN based at least in part on the handover information; and perform the MR-DC handover of the UE, wherein, when the selected target SN is different than the source RAN node of the UE, a configuration of the MR-DC handover is based at least in part on a direct forwarding path between the selected target SN and the source RAN node.

In some aspects, a non-transitory computer-readable medium may store one or more instructions for wireless communication. The one or more instructions, when executed by one or more processors of a source RAN node, may cause the one or more processors to provide handover information indicating a target secondary node (SN) for a multi radio access technology (multi-RAT) dual connectivity (DC) (MR-DC) handover of a user equipment (UE), wherein the handover information indicates that the target SN is the source RAN node, and wherein the MR-DC handover is an inter-system handover; and perform the MR-DC handover to a master node (MN) and the selected target SN, wherein, when a selected target SN of the MR-DC handover is different than the source RAN node of the UE, the MR-DC handover is based at least in part on a direct forwarding path between the selected target SN and the source RAN node.

In some aspects, a non-transitory computer-readable medium may store one or more instructions for wireless communication. The one or more instructions, when executed by one or more processors of a UE, may cause the one or more processors to receive a handover command indicating a selected target secondary node (SN) for a multi radio access technology (multi-RAT) dual connectivity (DC) (MR-DC) handover of the UE, wherein the selected target SN is selected from a set of target SNs including a source RAN node of the UE, and wherein the MR-DC handover is an inter-system handover; and perform the MR-DC handover to a master node (MN) and the selected target SN, wherein, when the selected target SN is different than the source RAN node of the UE, a configuration of the MR-DC handover is based at least in part on a direct forwarding path between the selected target SN and the source RAN node.

In some aspects, a non-transitory computer-readable medium may store one or more instructions for wireless communication. The one or more instructions, when executed by one or more processors of an MN, may cause the one or more processors to receive handover information indicating a target secondary node (SN) for a multi radio access technology (multi-RAT) dual connectivity (DC) (MR-DC) handover of a user equipment (UE), wherein the MR-DC handover is an inter-system handover; select the source RAN node or another node as the target SN based at least in part on the handover information; and perform the MR-DC handover of the UE, wherein, when the selected target SN is different than the source RAN node of the UE, a configuration of the MR-DC handover is based at least in part on a direct forwarding path between the selected target SN and the source RAN node.

In some aspects, an apparatus for wireless communication may include means for receiving handover information indicating a target secondary node (SN) for a multi radio access technology (multi-RAT) dual connectivity (DC) (MR-DC) handover of a user equipment (UE), wherein the handover information indicates that the target SN is a source RAN node of the UE, and wherein the MR-DC handover is an inter-system handover; means for selecting the source RAN node or another node as the target SN based at least in part on the handover information; and means for performing the MR-DC handover of the UE, wherein, when the selected target SN is different than the source RAN node of the UE, a configuration of the MR-DC handover is based at least in part on a direct forwarding path between the selected target SN and the source RAN node.

In some aspects, an apparatus for wireless communication may include means for providing handover information indicating a target secondary node (SN) for a multi radio access technology (multi-RAT) dual connectivity (DC) (MR-DC) handover of a user equipment (UE), wherein the handover information indicates that the target SN is the apparatus, and wherein the MR-DC handover is an inter-system handover; and means for performing the MR-DC handover to a master node (MN) and the selected target SN, wherein, when a selected target SN of the MR-DC handover is different than the apparatus, the MR-DC handover is based at least in part on a direct forwarding path between the selected target SN and the apparatus.

In some aspects, an apparatus for wireless communication may include means for receiving a handover command indicating a selected target secondary node (SN) for a multi radio access technology (multi-RAT) dual connectivity (DC) (MR-DC) handover of the apparatus, wherein the selected target SN is selected from a set of target SNs including a source RAN node of the apparatus, and wherein the MR-DC handover is an inter-system handover; and means for performing the MR-DC handover to a master node (MN) and the selected target SN, wherein, when the selected target SN is different than the source RAN node of the apparatus, a configuration of the MR-DC handover is based at least in part on a direct forwarding path between the selected target SN and the source RAN node.

In some aspects, an apparatus for wireless communication may include means for receiving handover information indicating a target secondary node (SN) for a multi radio access technology (multi-RAT) dual connectivity (DC) (MR-DC) handover of a user equipment (UE), wherein the MR-DC handover is an inter-system handover; means for selecting the source RAN node or another node as the target SN based at least in part on the handover information; and means for performing the MR-DC handover of the UE, wherein, when the selected target SN is different than the source RAN node of the UE, a configuration of the MR-DC handover is based at least in part on a direct forwarding path between the selected target SN and the source RAN node.

In some aspects, a method of wireless communication performed by a master node (MN) comprises receiving information indicating one or more candidate target secondary nodes (SNs) for a multi radio access technology (multi-RAT) dual connectivity (DC) (MR-DC) handover of a user equipment (UE), wherein the MR-DC handover is an inter-system handover, and wherein the information indicates that the one or more candidate target SNs are associated with direct forwarding paths with a source radio access network (RAN) node of the UE; selecting a target SN from the one or more candidate target SNs based at least in part on the received information; and performing the MR-DC handover of the UE, wherein the selected target SN is different than the source RAN node of the UE, and wherein a configuration of the MR-DC handover is based at least in part on a direct forwarding path between the selected target SN and the source RAN node. Thus, selection of a target SN for a handover based at least in part on a direct forwarding path is enabled, which reduces network resource usage associated with using indirect forwarding paths.

In some aspects, the method comprises requesting, from the selected target SN, at least one of information indicating whether there is a direct forwarding path between the selected target SN and the source RAN node, or one or more identifiers associated with the direct forwarding path. By requesting such information, the MN may conserve network resources that would otherwise be used to provide such information periodically, and may reduce the latency of obtaining such information relative to a periodic provision approach.

In some aspects, the method comprises receiving, from the selected target SN when there is a direct forwarding path between the selected target SN and the source RAN node, at least one of the one or more identifiers or the information indicating whether there is a direct forwarding path between the selected target SN and the source RAN node.

In some aspects, the method comprises forwarding at least one of the one or more identifiers to the source RAN node.

In some aspects, the information indicating the one or more candidate target SNs is received with the one or more identifiers or the information indicating whether there is a direct forwarding path between the selected target SN and the source RAN node. Thus, signaling resources are conserved that would otherwise be used to provide such information separately.

In some aspects, the one or more candidate target SNs include one or more radio access network nodes associated with cells that are candidate target primary cells of a secondary cell group associated with the selected target SN.

In some aspects, selecting the target SN further comprises selecting the target SN based at least in part on at least one of UE measurement information or the one or more candidate target SNs, and wherein the method further comprises requesting, from the selected target SN, at least one of information indicating whether there is a direct forwarding path between the selected target SN and the source RAN node, or one or more identifiers associated with the direct forwarding path; and receiving, from the selected target SN when there is a direct forwarding path between the selected target SN and the source RAN node, the one or more identifiers. By requesting such information, the MN may conserve network resources that would otherwise be used to provide such information periodically, and may reduce the latency of obtaining such information relative to a periodic provision approach.

In some aspects, the source RAN node is associated with a first core network and the MN is associated with a second core network different than the first core network. Thus, inter-core-network handover is enabled using direct forwarding paths.

In some aspects, the first core network is a 5G core network and the second core network is an evolved packet core.

In some aspects, the received information is received in a handover required message. Providing the received information in a handover required message conserves signaling resources relative to providing the received information separately from the handover required message.

In some aspects, a method of wireless communication performed by a target secondary node (SN) includes transmitting, to a master node (MN), information indicating one or more candidate target secondary nodes (SN) for a multi radio access technology (multi-RAT) dual connectivity (DC) (MR-DC) handover of a user equipment (UE), wherein the MR-DC handover is an inter-system handover, and wherein the information indicates that the one or more candidate target SNs are associated with direct forwarding paths with a source radio access network (RAN) node of the UE, and wherein the one or more candidate target SNs include the target SN; and performing the MR-DC handover of the UE, wherein the target SN is selected for the MR-DC handover and is different than the source RAN node of the UE, and wherein a configuration of the MR-DC handover is based at least in part on a direct forwarding path between the selected target SN and the source RAN node.

In some aspects, the method comprises receiving a request for at least one of information indicating whether there is a direct forwarding path between the selected target SN and the source RAN node, or one or more identifiers associated with the direct forwarding path.

In some aspects, the method comprises transmitting, based at least in part on the request and there being a direct forwarding path between the selected target SN and the source RAN node, at least one of the one or more identifiers or the information indicating whether there is a direct forwarding path between the selected target SN and the source RAN node.

In some aspects, the information indicating the one or more candidate target SNs is transmitted with the one or more identifiers or the information indicating whether there is a direct forwarding path between the selected target SN and the source RAN node.

In some aspects, the one or more candidate target SNs include one or more radio access network nodes associated with cells that are candidate target primary cells of a secondary cell group associated with the selected target SN.

In some aspects, the source RAN node is associated with a first core network and wherein the MN is associated with a second core network different than the first core network.

In some aspects, the first core network is a 5G core network and the second core network is an evolved packet core.

In some aspects, a method of wireless communication performed by source radio access node (RAN) comprises transmitting, to a master node (MN), information indicating one or more candidate target secondary nodes (SN) for a multi radio access technology (multi-RAT) dual connectivity (DC) (MR-DC) handover of a user equipment (UE), wherein the MR-DC handover is an inter-system handover; and performing the MR-DC handover of the UE, wherein a selected target SN of the MR-DC handover is selected from the one or more candidate target SNs and is different than the source RAN node of the UE, and wherein a configuration of the MR-DC handover is based at least in part on a direct forwarding path between the selected target SN and the source RAN node.

In some aspects, the method comprises receiving, from the selected target SN via the MN, one or more identifiers associated with the direct forwarding path if there is a direct forwarding path from the selected target SN.

In some aspects, the one or more candidate target SNs include one or more radio access network nodes associated with cells that are candidate target primary cells of a secondary cell group associated with the selected target SN.

In some aspects, the source RAN node is associated with a first core network and wherein the MN is associated with a second core network different than the first core network.

In some aspects, the first core network is a 5G core network and the second core network is an evolved packet core.

In some aspects, a master node (MN) for wireless communication includes a memory; and one or more processors operatively coupled to the memory, the memory and the one or more processors configured to receive information indicating one or more candidate target secondary nodes (SNs) for a multi radio access technology (multi-RAT) dual connectivity (DC) (MR-DC) handover of a user equipment (UE), wherein the MR-DC handover is an inter-system handover, and wherein the information indicates that the one or more candidate target SNs are associated with direct forwarding paths with a source radio access network (RAN) node of the UE; select a target SN from the one or more candidate target SNs based at least in part on the received information; and perform the MR-DC handover of the UE, wherein the selected target SN is different than the source RAN node of the UE, and wherein a configuration of the MR-DC handover is based at least in part on a direct forwarding path between the selected target SN and the source RAN node.

In some aspects, the one or more processors are configured to request, from the selected target SN, at least one of information indicating whether there is a direct forwarding path between the selected target SN and the source RAN node, or one or more identifiers associated with the direct forwarding path.

In some aspects, the one or more processors are configured to receive, from the selected target SN when there is a direct forwarding path between the selected target SN and the source RAN node, at least one of the one or more identifiers or the information indicating whether there is a direct forwarding path between the selected target SN and the source RAN node.

In some aspects, the one or more processors are configured to forward at least one of the one or more identifiers to the source RAN node.

In some aspects, the information indicating the one or more candidate target SNs is received with the one or more identifiers or the information indicating whether there is a direct forwarding path between the selected target SN and the source RAN node.

In some aspects, the one or more candidate target SNs include one or more radio access network nodes associated with cells that are candidate target primary cells of a secondary cell group associated with the selected target SN.

In some aspects, the one or more processors, when selecting the target SN, are configured to select the target SN based at least in part on at least one of UE measurement information or the one or more candidate target SNs, and the one or more processors are configured to request, from the selected target SN, at least one of information indicating whether there is a direct forwarding path between the selected target SN and the source RAN node, or one or more identifiers associated with the direct forwarding path; and receive, from the selected target SN when there is a direct forwarding path between the selected target SN and the source RAN node, the one or more identifiers.

In some aspects, the source RAN node is associated with a first core network and the MN is associated with a second core network different than the first core network.

In some aspects, the first core network is a 5G core network and the second core network is an evolved packet core.

In some aspects, the received information is received in a handover required message.

In some aspects, a target secondary node (SN) for wireless communication includes a memory; and one or more processors operatively coupled to the memory, the memory and the one or more processors configured to transmit, to a master node (MN), information indicating one or more candidate target secondary nodes (SN) for a multi radio access technology (multi-RAT) dual connectivity (DC) (MR-DC) handover of a user equipment (UE), wherein the MR-DC handover is an inter-system handover, wherein the information indicates that the one or more candidate target SNs are associated with direct forwarding paths with a source radio access network (RAN) node of the UE, and wherein the one or more candidate target SNs include the target SN; and perform the MR-DC handover of the UE, wherein the target SN is selected for the MR-DC handover and is different than the source RAN node of the UE, and wherein a configuration of the MR-DC handover is based at least in part on a direct forwarding path between the selected target SN and the source RAN node.

In some aspects, the one or more processors are configured to receive a request for at least one of information indicating whether there is a direct forwarding path between the selected target SN and the source RAN node, or one or more identifiers associated with the direct forwarding path.

In some aspects, the one or more processors are configured to transmit, based at least in part on the request and there being a direct forwarding path between the selected target SN and the source RAN node, at least one of the one or more identifiers or the information indicating whether there is a direct forwarding path between the selected target SN and the source RAN node.

In some aspects, the information indicating the one or more candidate target SNs is transmitted with the one or more identifiers or the information indicating whether there is a direct forwarding path between the selected target SN and the source RAN node.

In some aspects, the one or more candidate target SNs include one or more radio access network nodes associated with cells that are candidate target primary cells of a secondary cell group associated with the selected target SN.

In some aspects, the source RAN node is associated with a first core network and wherein the MN is associated with a second core network different than the first core network.

In some aspects, the first core network is a 5G core network and the second core network is an evolved packet core.

In some aspects, a source radio access network (RAN) node for wireless communication includes a memory; and one or more processors operatively coupled to the memory, the memory and the one or more processors configured to transmit, to a master node (MN), information indicating one or more candidate target secondary nodes (SN) for a multi radio access technology (multi-RAT) dual connectivity (DC) (MR-DC) handover of a user equipment (UE), wherein the MR-DC handover is an inter-system handover; and perform the MR-DC handover of the UE, wherein a selected target SN of the MR-DC handover is selected from the one or more candidate target SNs and is different than the source RAN node of the UE, and wherein a configuration of the MR-DC handover is based at least in part on a direct forwarding path between the selected target SN and the source RAN node.

In some aspects, the one or more processors are configured to receive, from the selected target SN via the MN, one or more identifiers associated with the direct forwarding path if there is a direct forwarding path from the selected target SN.

In some aspects, the one or more candidate target SNs include one or more radio access network nodes associated with cells that are candidate target primary cells of a secondary cell group associated with the selected target SN.

In some aspects, the source RAN node is associated with a first core network and the MN is associated with a second core network different than the first core network.

In some aspects, the first core network is a 5G core network and the second core network is an evolved packet core.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 15 is a data flow diagram illustrating the data flow between different components in an example apparatus, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
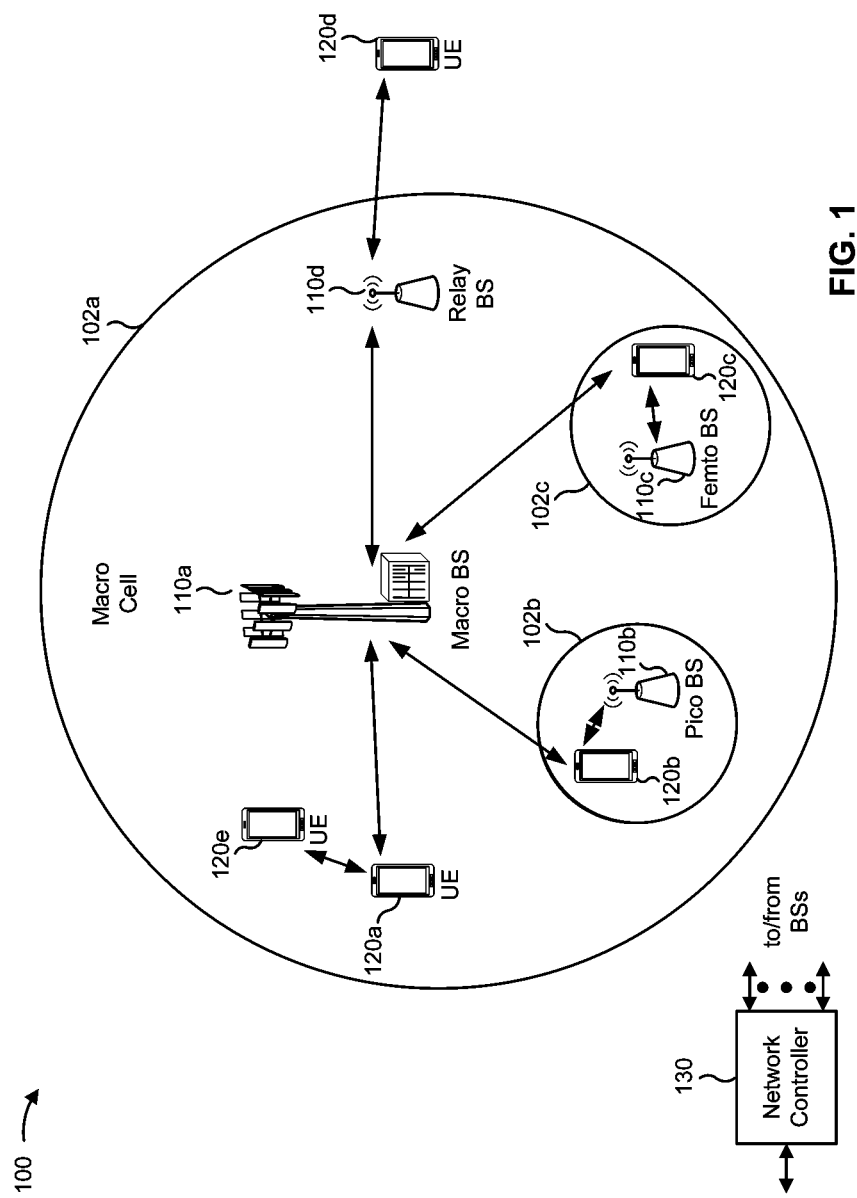
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
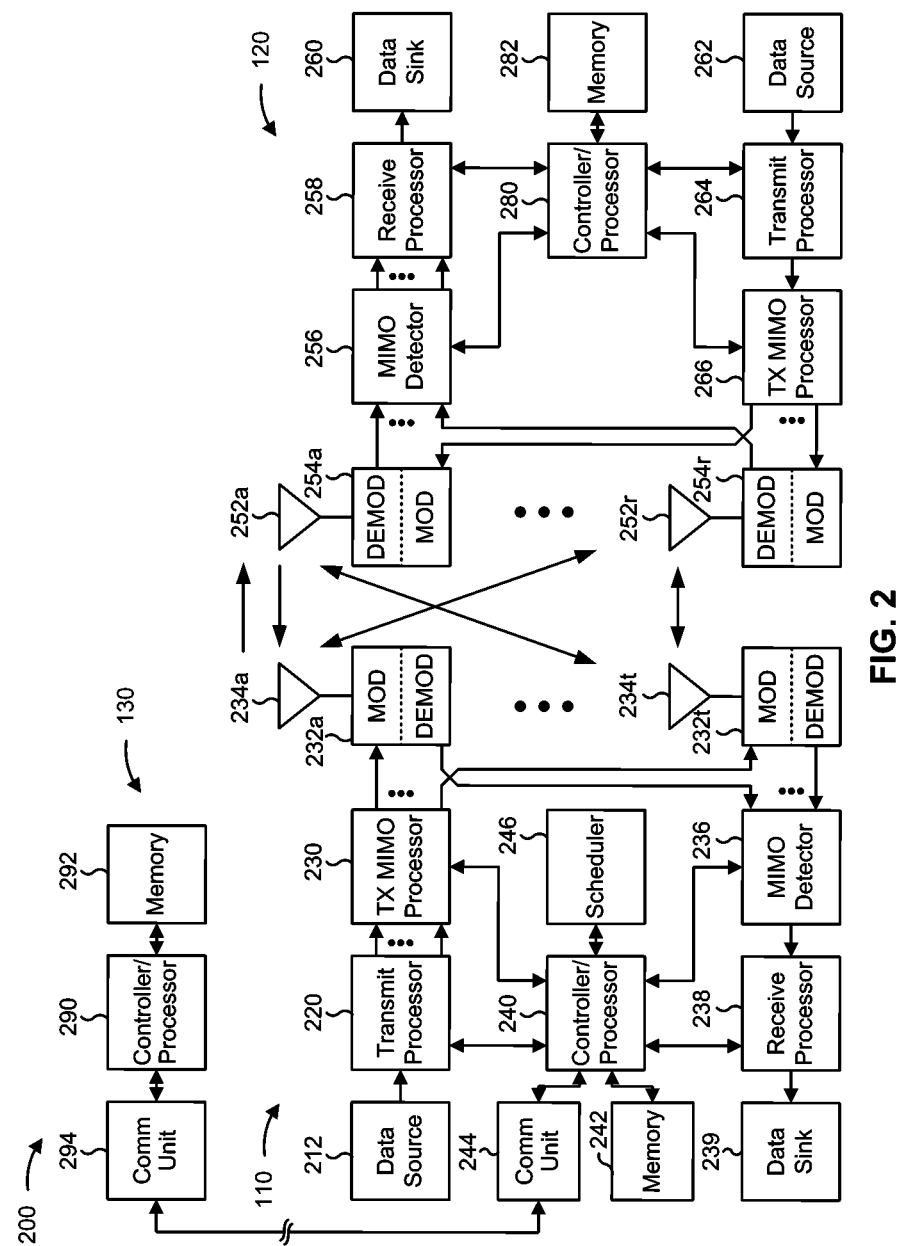
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with inter-system handover from an SA mode to an NSA mode, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, process 800 of FIG. 8, and/or other processes as described herein. A scheduler 246 may schedule UEs for data transmission on the downlink and/or uplink.

In some aspects, a master node (e.g., base station 110, an eNB, and/or the like) may include means for receiving handover information indicating a target secondary node (SN) for a multi radio access technology (multi-RAT) dual connectivity (DC) (MR-DC) inter-system handover of a user equipment (UE); means for selecting the source RAN node or another node as the target SN based at least in part on the handover information; means for performing the MR-DC handover of the UE; means for performing the MR-DC handover without configuring or performing data forwarding between the source RAN node and the MN; means for requesting, from the selected target SN, at least one of information indicating whether there is a direct forwarding path between the selected target SN and the source RAN node, or one or more identifiers associated with the direct forwarding path; means for receiving, from the selected target SN when there is a direct forwarding path between the selected target SN and the source RAN node, the one or more identifiers; means for providing, to the selected target SN in connection with an interface setup procedure with the selected target SN, information indicating a set of radio access network (RAN) nodes associated with direct forwarding paths with the MN; means for receiving, from the selected target SN in connection with the interface setup procedure, information indicating a set of RAN nodes associated with direct forwarding paths with the selected target SN; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a source RAN node (e.g., base station 110, a gNB, and/or the like) may include means for providing handover information indicating a target secondary node (SN) for a multi radio access technology (multi-RAT) dual connectivity (DC) (MR-DC) inter-system handover of a user equipment (UE); means for performing the MR-DC handover to a master node (MN) and the selected target SN; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for receiving a handover command indicating a selected target secondary node (SN) for a multi radio access technology (multi-RAT) dual connectivity (DC) (MR-DC) handover of the UE; means for performing the MR-DC handover to a master node (MN) and the selected target SN; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

A UE may perform a handover from one system to another system, referred to herein as an inter-system handover. As used herein, a system may refer to a core network associated with a radio access technology (RAT). Thus, an inter-system handover is a handover from a core network associated with a first RAT (e.g., 5G/NR) to a core network associated with another RAT (e.g., 4G/LTE).

One example of an inter-system handover is a handover from a standalone (SA) mode to a non-standalone (NSA) mode, such as a handover from a 5G SA mode to an E-UTRA-NR dual connectivity (EN-DC) mode. In the EN-DC mode, a master node may be a 4G/LTE node, such as an eNB, and a secondary node may be a 5G/NR node, such as a gNB. In this case, the UE may first handover from a source RAN node (e.g., a source gNB) to a target node (e.g., a target eNB), and then may configure EN-DC based at least in part on the target eNB being selected as a master node (MN or MeNB) and a target gNB being selected as a secondary node (SN or SgNB). This may be considered an inter-system handover, since the source RAN node may be associated with a 5G/NR core (5GC) network (e.g., accessed via a next generation radio access network (NG-RAN) node such as a gNB) and the target eNB may be associated with a 4G/LTE core network (e.g., an evolved packet core (EPC) accessed via an eNB).

An inter-system handover may improve network performance, throughput, and reliability in certain circumstances. For example, consider when a UE initiates an ongoing IMS call in an SA system with an ongoing data flow and where Voice over NR (VoNR) is not supported. In this case, the UE may drop either the IMS call or the data flow if the UE is in a single-connectivity configuration, since the UE cannot handle the IMS call via VoNR. By performing an inter-system handover to EN-DC (or another multi-RAT DC (MR-DC) mode), the UE may contemporaneously perform the IMS call and transmit or receive the data flow.

In some cases, a target MN may select an SN for an MR-DC handover. For example, the target MN may identify a set of potential SNs and may select a selected SN from the set of potential SNs. In some cases, the SN may be different than the source NG-RAN node associated with the UE. For example, the SN may be a different gNB than the source NG-RAN node and/or may not have a direct data forwarding relationship with the source NG-RAN node. In such cases, the source NG-RAN and/or the MN may have to configure data forwarding (e.g., direct or indirect data forwarding) which introduces latency and reduces throughput.

Some techniques and apparatuses described herein provide for a source NG-RAN node to be selected as the target SN for an MR-DC mode. Additionally, or alternatively, some techniques and apparatuses described herein provide direct data forwarding between the source NG-RAN node and the SN in the case when the SN is not the same node as the source NG-RAN node. For example, some techniques and apparatuses described herein provide for the source NG-RAN node to signal the source NG-RAN node's identity, for example, in association with a handover required message transmitted to the 5GC. The MN may select an SN based at least in part on the handover required message. In the case when the MN selects the source NG-RAN node as the SN, network resources may be conserved that would otherwise be used to configure indirect or direct data forwarding, and latency that would otherwise be introduced by indirect or direct data forwarding is reduced.

In the case when the MN selects a different node than the source NG-RAN node as the SN, techniques and apparatuses described herein provide direct data forwarding between the source NG-RAN node and the selected SN. For example, the SN may provide, to the MN as part of the SN addition procedure, information indicating a direct data path from the SN to the source NG-RAN. Additionally, or alternatively, the handover required message may indicate a set of SNs that are associated with direct path availability relative to the source NG-RAN node. As another example, the target MN and the target SN may exchange information indicating a set of RAN nodes associated with direct path availability, and the MN may obtain, from the target SN, information indicating a direct data path from the SN to the source NG-RAN node (when the source NG-RAN node is identified by the information indicating the set of RAN nodes associated with direct path availability).

In this way, an inter-system handover from a source RAN node in an NSA mode (e.g., an NG-RAN node in a 5G NSA mode) to an MR-DC mode, such as with a master eNB (MeNB) and a secondary gNB (SgNB), is provided. By configuring the SgNB to be a same node as a source NG-RAN node of a UE, computing resources of the SgNB and the UE are conserved that would otherwise be used to configure indirect data forwarding between the SgNB and the source NG-RAN node. Furthermore, in the case when the SgNB is different than the source NG-RAN node, techniques for configuring or selecting an SgNB with direct data forwarding from the source NG-RAN node are provided, which reduces latency and computing resource consumption that would otherwise be associated with indirect data forwarding.

Figure 3:
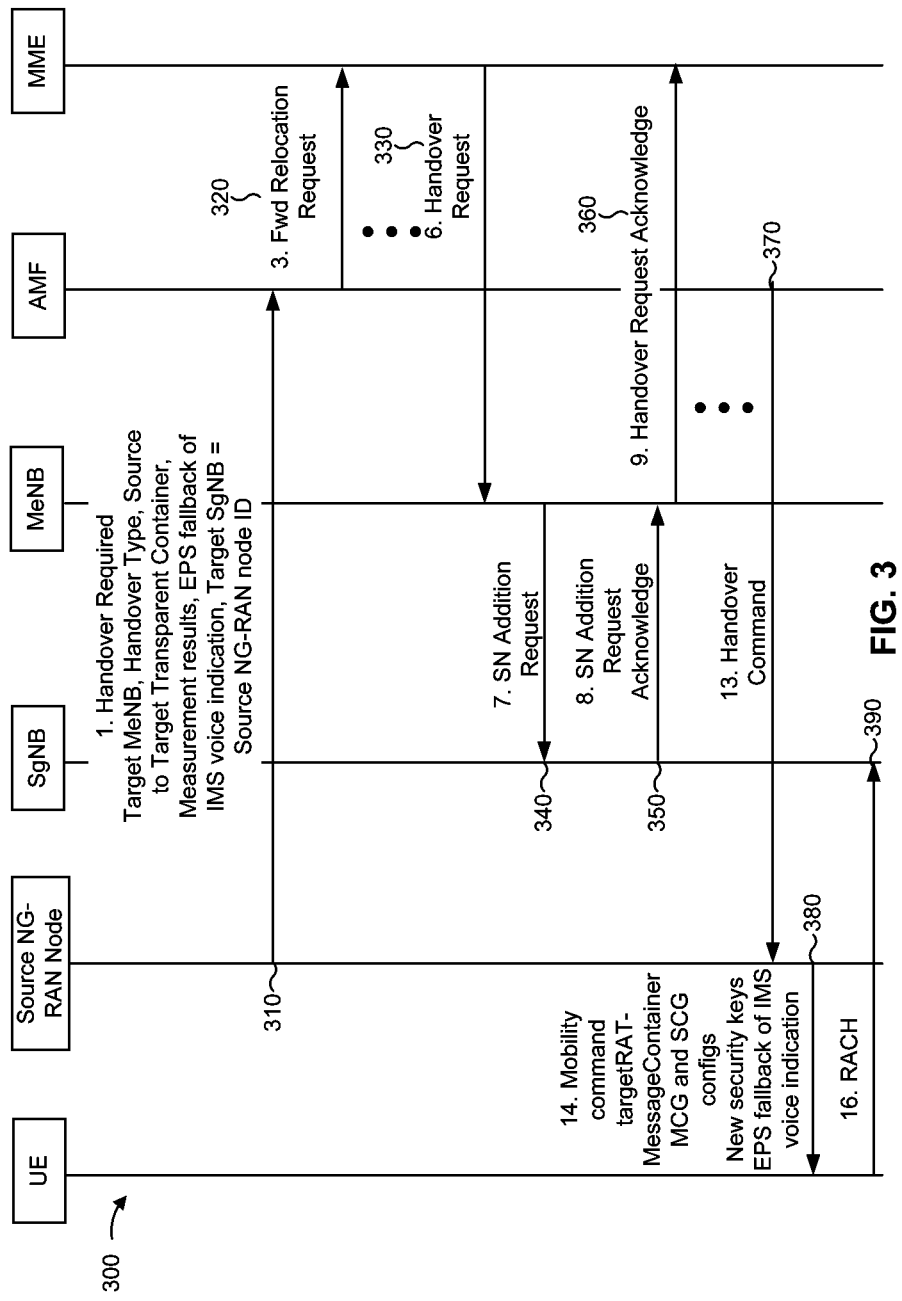
FIG. 3 is a diagram illustrating an example of signaling associated with an inter-system handover from a standalone (SA) mode to a non-standalone (NSA) mode, in accordance with various aspects of the present disclosure.

FIG. 3 is a diagram illustrating an example 300 of signaling associated with an inter-system handover from a standalone (SA) mode to a non-standalone (NSA) mode, in accordance with various aspects of the present disclosure. As shown, example 300 includes a UE (e.g., UE 120), a source NG-RAN node (e.g., BS 110, a gNB, and/or the like), an SgNB (e.g., BS 110, a gNB, an SN, and/or the like), an MeNB (e.g., BS 110, an eNB, an MN, and/or the like), an access and mobility management function (AMF), and a mobility management entity (MME).

The signaling shown in example 300 may be part of an inter-system handover procedure from an SA mode to an NSA mode. Certain steps of the inter-system handover procedure are omitted in FIG. 3 for brevity, such as steps 2 (e.g., steps 2a-2c of FIG. 4.1.1.2.1-1 of 3GPP TS 23.502, in which the AMF obtains an SM context), 4 (e.g., create session request), 5 (e.g., create session response, 10 through 12 (indirect data forwarding tunnel establishment, relocation response, and mapping of EPS bearers to QoS flows, respectively), 15 (RACH procedure), and steps after step 16 (RRC connection reconfiguration complete signaling, SgNB reconfiguration complete signaling, handover notify, relocation complete notification and acknowledgment, modify bearer request and response, and N4 session modification). Furthermore, some network nodes or devices that are involved in the inter-system handover procedure are omitted in FIG. 3, such as a serving gateway (S-GW), a packet data network (PDN) gateway (P-GW), and a user plane function (UPF).

As shown in FIG. 3, and by reference number 310, the source NG-RAN node may provide a handover required message to the AMF. As further shown, the handover required message may include information associated with performing an inter-system handover to an MR-DC mode, such as information indicating a target MN (e.g., the MeNB), a handover type (e.g., 5GStoEPS and/or the like), a source-to-target transparent container (e.g., including a handover preparation information message that indicates UE radio access capabilities, a UE access-stratum configuration, a UE access-stratum context, a UE radio resource management configuration comprising available UE measurement reports, a list of radio access bearers corresponding to one or more 5G quality of service flows that are proposed for downlink data forwarding, an indication that the handover is associated with a evolved packet system (EPS) fallback of an IMS voice call, and/or the like), and/or the like.

As further shown, the handover required message may indicate that the source NG-RAN node can be selected as the target SgNB. For example, the handover required message may include a source NG-RAN node identifier (e.g., a global identifier), and may request that the source NG-RAN node be considered as a potential candidate for the target SN. Selecting the source NG-RAN node as the target SN may reduce overhead and latency in the inter-system handover by eliminating the need for downlink direct data forwarding from the source NG-RAN node to the target MN. For example, if the source NG-RAN node is different than the target SN, then the source NG-RAN node and/or the AMF may configure direct downlink data forwarding from the source NG-RAN node to the target SN, or indirect downlink data forwarding from the source NG-RAN node to a UPF, then to the target SN via an S-GW associated with the target SN.

As shown by reference number 320, the AMF may provide a forward relocation request to the MME. For example, the AMF may select the MME based at least in part on the target MeNB information indicated by the handover required message, and may provide a forward relocation request to the selected MME. The forward relocation may indicate whether direct data forwarding is to be used for the inter-system handover. The MME may select an appropriate S-GW based at least in part on an S-GW address included in the forward relocation request and may request that the S-GW create a session (not shown).

As shown by reference number 330, the MME may provide a handover request to the MeNB. For example, the target MeNB may determine whether the handover should be to an EN-DC system, and may select the SN of the EN-DC system based at least in part on information indicating data flows to be handed over, available UE measurement results, and the target SN (e.g., the source NG-RAN node or another target SN) identifier, if provided. The target MeNB may perform admission control for the handover and may determine a set of EPS bearers to be set up upon handover.

In some aspects, the source NG-RAN node may not provide an identifier of the source NG-RAN node as a potential target SN. In this case, the MeNB may determine whether the handover should be to an EN-DC system based at least in part on the indication of the EPS fallback for the IMS voice call and the received information regarding the data flows that are to be handed over. In this case, the target MeNB may select a target SgNB based at least in part on the available UE measurement results.

As shown by reference number 340, the MeNB may provide an SN addition request message to the SgNB, and as shown by reference number 350, the SgNB may provide an SN addition request acknowledge message to the MeNB. As shown by reference number 360, the MeNB may provide a handover request acknowledge message to the MME. Thus, as shown by reference number 370, the AMF may provide a handover command to the source NG-RAN node, and the source NG-RAN node may provide a mobility command to the UE 120, as shown by reference number 380.

As shown by reference number 390, the UE may perform a random access channel (RACH) procedure with regard to the target SgNB. The UE may perform such a RACH procedure even if the target SgNB is the source NG-RAN node, since the UE may receive updated security keys in connection with the mobility command associated with the handover. The RACH procedure may indicate, to the target SgNB, that the target SgNB is to use the updated security keys with regard to the UE.

Thus, the source NG-RAN may indicate, to one or more devices or functions responsible for selecting a target SN, that the source NG-RAN can be selected as the target SN. If the source NG-RAN is selected as the target SN, then overhead and latency may be reduced relative to a case when direct or indirect downlink data forwarding is configured from the source NG-RAN to the selected target SN.

As indicated above, FIG. 3 is provided as an example. Other examples may differ from what is described with respect to FIG. 3.

Figure 4:
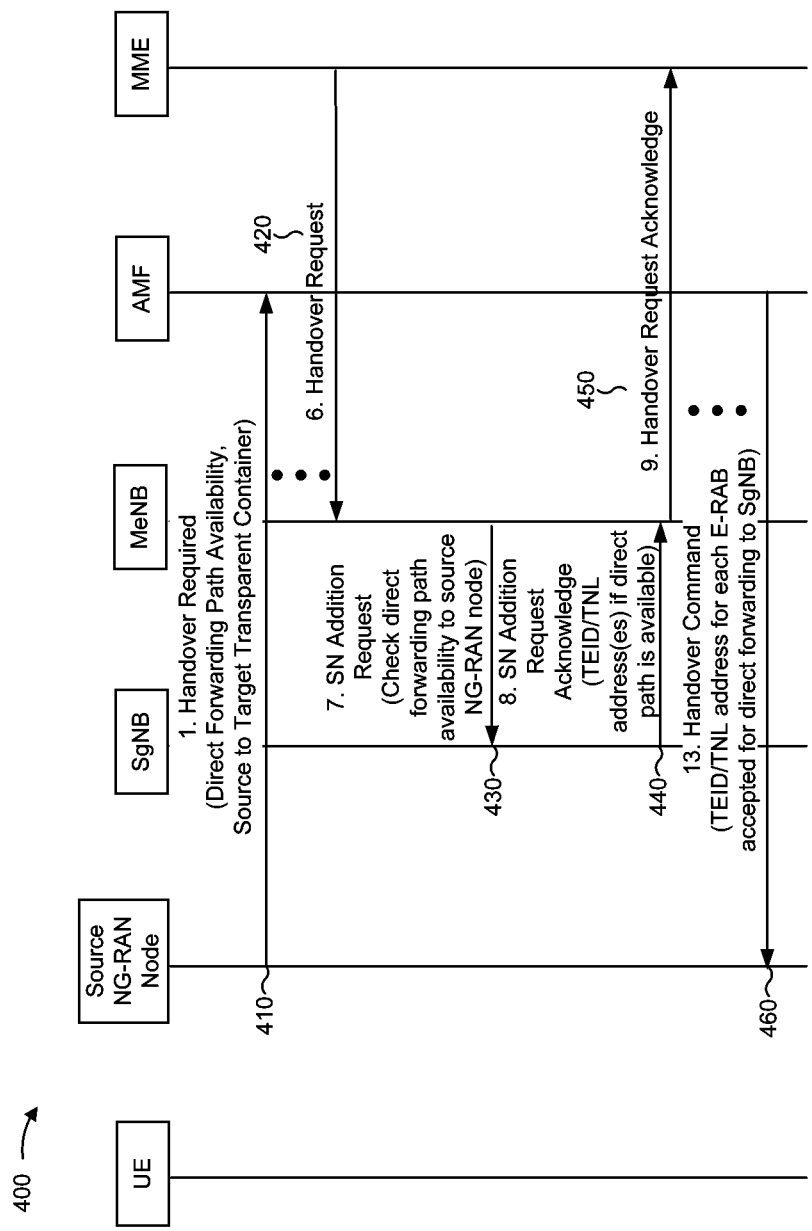
FIG. 4 is a diagram illustrating another example of signaling associated with an inter-system handover from an SA mode to an NSA mode, in accordance with various aspects of the present disclosure.

FIG. 4 is a diagram illustrating another example 400 of signaling associated with an inter-system handover from an SA mode to an NSA mode, in accordance with various aspects of the present disclosure. As shown, example 400 includes a UE (e.g., UE 120), a source NG-RAN node (e.g., BS 110, a gNB, and/or the like), an SgNB (e.g., BS 110, a gNB, an SN, and/or the like), an MeNB (e.g., BS 110, an eNB, an MN, and/or the like), an access and mobility management function (AMF), and a mobility management entity (MME).

The signaling shown in example 400 may be part of an inter-system handover procedure from an SA mode to an NSA mode. Certain steps of the inter-system handover procedure are omitted in FIG. 4 for brevity, such as steps 2 through 5, steps 10 through 12, and steps after step 13. One or more of the omitted steps may be modified to support the changes to signaling of the steps shown in FIG. 4. Furthermore, some network nodes or devices that are involved in the inter-system handover procedure are omitted in FIG. 4, such as an S-GW, a P-GW, and a UPF.

As shown in FIG. 4, and by reference number 410, the source NG-RAN node may provide a handover required message indicating direct forwarding path availability of the source NG-RAN node relative to one or more MeNBs. As further shown, the handover required message may include a source to target transparent container. In some aspects, the handover required message may include at least part of the content described in connection with the handover required message of FIG. 3, such as information indicating a handover type, a target MeNB identifier, a target cell identifier, a target SgNB identifier (which may identify the source NG-RAN node), a handover preparation information message including a UE radio access capability, an access stratum configuration, an access stratum context, a radio resource management configuration, or the like.

In some aspects, the handover required message may indicate direct forwarding path availability for one or more target SgNBs, referred to herein as one or more candidate target SgNBs or SNs. For example, the handover required message may indicate a set of NG-RAN nodes whose cells can be candidate target primary secondary cells (PSCells) based at least in part on UE measurements. The set of NG-RAN nodes may be determined by an operations, administration, and management (OAM) function, may be determined using a procedure defined by the OAM function, or may be gathered through automated neighbor relation (ANR) procedures of the UE. This approach may provide flexibility to the target MeNB in choosing an appropriate target SgNB. For example, if direct data forwarding is desirable for faster resumption of data flow after handover (e.g., lesser data interruption), the target MeNB can select the NG-RAN node to which there is a direct path, among two NG-RAN nodes which are equally preferable if only UE measurements are considered.

In some aspects, the handover required message may include an information element indicating a set of SgNB identifiers to which the source NG-RAN node has a direct path. For example, the source to target transparent container may include this information element. In this case, the direct forwarding path availability information element of the handover required message may indicate a direct forwarding path availability for the target MeNB.

As shown by reference number 420, the MME may provide a handover request to the MeNB. The handover request may include at least part of the information included in the handover request described in connection with FIG. 3. As shown by reference number 430, the MeNB may provide an SN addition request to the SgNB. As further shown, the SN addition request may indicate that the SgNB is to check direct forwarding path availability to the source NG-RAN node, for example, based at least in part on an identifier of the source NG-RAN node. For example, the MeNB may request that the target SgNB is associated with a direct path to the source NG-RAN node. As used herein, a direct path (also referred to as a direct forwarding path) may refer to a neighbor relation or a tunnel between two nodes or a similar routing relationship, or may refer to two nodes that are associated with a physical link with each other. For example, multiple tunnels can be set up on a direct path between two nodes, and each tunnel may be identified by a tunnel endpoint identifier (TEID) for data transfer for various radio bearers. In some aspects, a tunnel may include a SN-terminated bearer set up by a target SgNB, such as an Evolved Universal Mobile Telecommunications Service (UMTS) Terrestrial Radio Access Network (E-UTRAN) radio access bearer (E-RAB).

As shown by reference number 440, the source NG-RAN node may provide an SN addition request acknowledge message to the MeNB. As further shown, the SN addition request acknowledge message may identify one or more direct forwarding paths between the source NG-RAN node and the SgNB. For example, the SN addition request acknowledge message may identify one or more TEIDs, one or more transport network layer (TNL) addresses, and/or the like, associated with the one or more direct forwarding paths (e.g., for which downlink direct data forwarding from the source NG-RAN node to the target SgNB is applicable).

The source NG-RAN node may initiate the handover procedure upon receiving an RRC measurement report from the UE. Based at least in part on the measurement report containing the measurement results, the source NG-RAN node can identify the NG-RAN nodes whose cells can be candidate target primary secondary cells (PSCells). This set of NG-RAN nodes includes the candidate target SgNBs, and based at least in part on whether there is Internet Protocol (IP) connectivity to the source NG-RAN node (which the source NG-RAN node can check), the source NG-RAN node may determine the candidate target SgNBs to which the source NG-RAN node has a direct forwarding path.

As shown by reference number 450, the MeNB may provide a handover request acknowledge message to the MME. For example, the MeNB may select a target SgNB associated with a direct forwarding path and may provide the handover request acknowledge message indicating the selected target SgNB. The MME may establish direct and/or indirect data forwarding tunnels (e.g., based at least in part on the one or more direct forwarding paths), communicate with the AMF to map EPS bearers to QoS flows, and provide a relocation response to the AMF in association with the handover. For example, the MME may receive, from the MeNB (e.g., in a handover request acknowledge message) information indicating the one or more direct forwarding paths, such as the one or more TEIDs, one or more TNL addresses, or the like.

As shown by reference number 460, the AMF may provide a handover command to the source NG-RAN. As further shown, the handover command may identify a direct forwarding path for direct forwarding from the source NG-RAN node to the SgNB. For example, the handover command may identify one or more TEIDs and/or one or more TNLs associated with a direct forwarding path between the source NG-RAN and the SgNB. The source NG-RAN may establish the direct forwarding path in accordance with the one or more TEIDs and/or the one or more TNLs and may proceed with the inter-system handover of the UE. In this way, an SgNB with a direct forwarding path from the source NG-RAN node may be selected based at least in part on information indicating that the SgNB is associated with the direct forwarding path (e.g., received from the target SgNB and forwarded to the source NG-RAN node via the MeNB), thereby conserving network resources and reducing latency and overhead associated with establishing and using an indirect forwarding path between the source NG-RAN node and the SgNB.

As indicated above, FIG. 4 is provided as an example. Other examples may differ from what is described with respect to FIG. 4.

Figure 5:
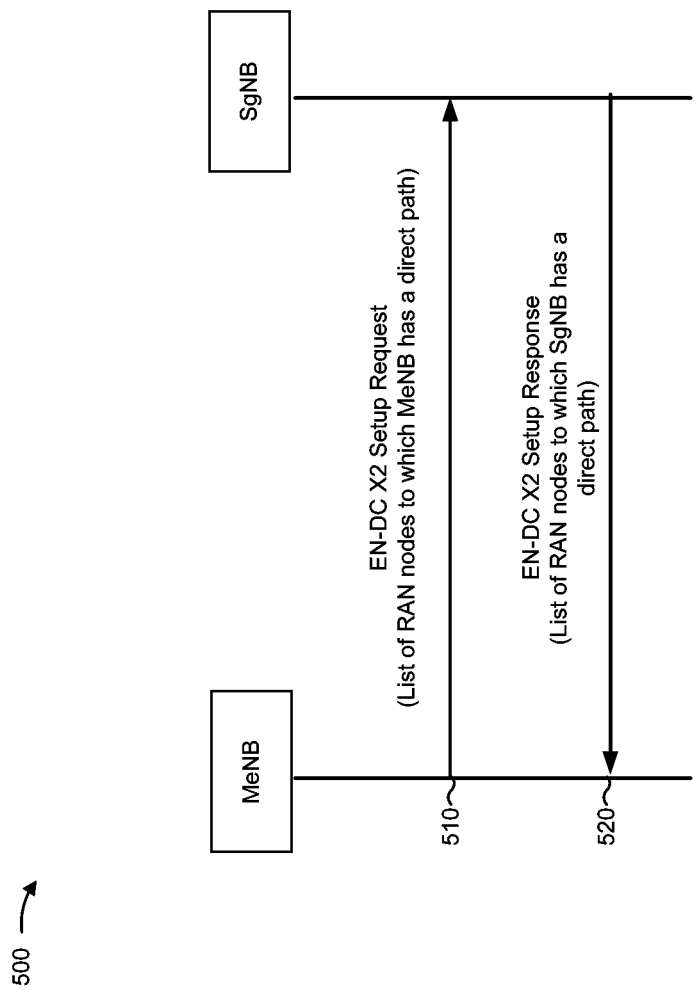
FIG. 5 is a diagram illustrating yet another example of signaling associated with an inter-system handover from an SA mode to an NSA mode, in accordance with various aspects of the present disclosure.

FIG. 5 is a diagram illustrating yet another example of signaling associated with an inter-system handover from an SA mode to an NSA mode, in accordance with various aspects of the present disclosure. FIG. 5 shows X2 interface setup signaling between an MeNB and an SgNB, such as the MeNB and the SgNB described in connection with FIGS. 3-5.

As shown in FIG. 5, and by reference number 510, the MeNB may provide an EN-DC X2 setup request to the SgNB. As further shown, the EN-DC X2 setup request may indicate a set of RAN nodes to which the MeNB has a direct forwarding path. Furthermore, as shown by reference number 520, the SgNB may provide an EN-DC X2 setup response. As further shown, the EN-DC X2 setup response may indicate a set of RAN nodes to which the SgNB has a direct path. In other words, the target MeNB and the selected SgNB can exchange information indicating respective sets of RAN nodes to which the MeNB and the selected SgNB are associated with direct forwarding paths as part of the EN-DC X2 setup procedure. In this case, the target MeNB may identify a direct forwarding path between the SgNB and the source NG-RAN node, and may obtain, from the source NG-RAN node, information identifying the direct forwarding path (e.g., one or more TEIDs and/or TNL addresses of the direct forwarding path), as described in more detail in connection with FIG. 4.

In some aspects, the direct data forwarding aspects described above can extend to the general case of MR-DC inter-system handovers. For example, a target MN can request a target SN to determine whether the target SN has a direct path available to the source SN. If the target SN has a direct path to the source SN, the target SN can provide one or more TEIDs and/or one or more TNL addresses to the target MN, which the target MN can forward to the source SN in the handover command message. As another example, the source SN can indicate, to the target MN in the handover request message, the set of SNs among the potential target SNs to which the source SN has a direct path. The target MN can then select an SN using this information and obtain the one or more TEIDs and/or TNL addresses as described above. Furthermore, the target MN and the target SN can exchange the set of RAN nodes to which the target MN and the target SN is directly connected in the X2 or Xn interface setup procedure.

As indicated above, FIG. 5 is provided as an example. Other examples may differ from what is described with respect to FIG. 5.

Figure 6:
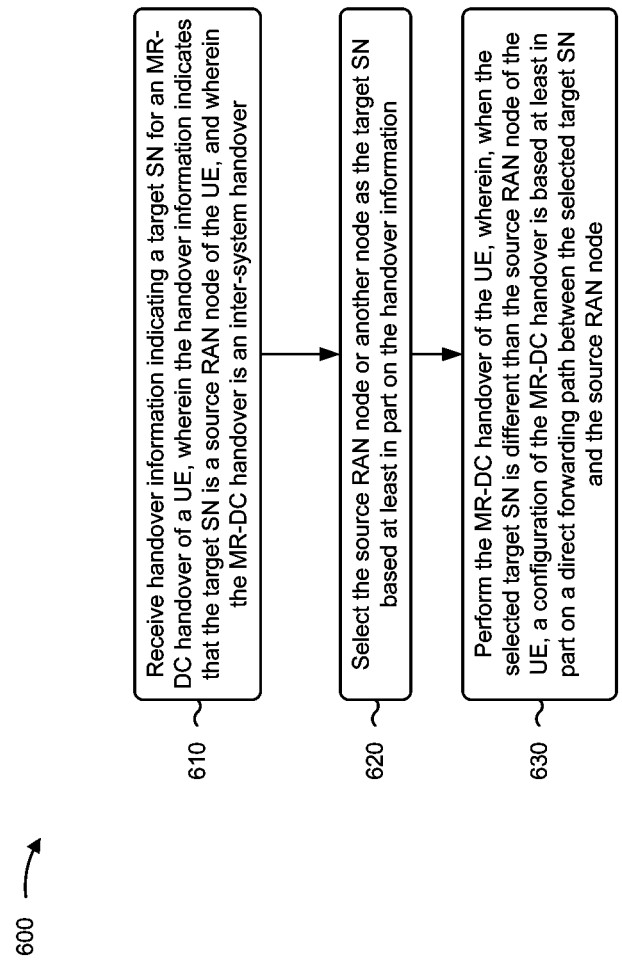
FIG. 6 is a diagram illustrating an example process performed, for example, by a master node (MN), in accordance with various aspects of the present disclosure.

FIG. 6 is a diagram illustrating an example process 600 performed, for example, by an MN, in accordance with various aspects of the present disclosure. Example process 600 is an example where the MN (e.g., BS 110, the MN shown in FIGS. 3-5, and/or the like) performs operations associated with an inter-system MR-DC handover.

As shown in FIG. 6, in some aspects, process 600 may include receiving handover information indicating a target SN for a MR-DC handover of a UE, wherein the handover information indicates that the target SN is a source RAN node of the UE, and wherein the MR-DC handover is an inter-system handover (block 610). For example, the MN (e.g., using antenna 234, DEMOD 232, MIMO detector 236, receive processor 238, controller/processor 240, and/or the like) may receive handover information indicating a target SN for a MR-DC handover of a UE, as described above. In some aspects, the handover information indicates that the target SN is a source RAN node of the UE. In some aspects, the MR-DC handover is an inter-system handover.

As further shown in FIG. 6, in some aspects, process 600 may include selecting the source RAN node or another node as the target SN based at least in part on the handover information (block 620). For example, the MN (e.g., using antenna 234, DEMOD 232, MIMO detector 236, receive processor 238, controller/processor 240, and/or the like) may select the source RAN node or another node as the target SN based at least in part on the handover information, as described above.

As further shown in FIG. 6, in some aspects, process 600 may include performing the MR-DC handover of the UE, wherein, when the selected target SN is different than the source RAN node of the UE, a configuration of the MR-DC handover is based at least in part on a direct forwarding path between the selected target SN and the source RAN node (block 630). For example, the MN (e.g., using controller/processor 240, transmit processor 220, TX MIMO processor 230, MOD 232, antenna 234, and/or the like) may perform the MR-DC handover of the UE, as described above. In some aspects, when the selected target SN is different than the source RAN node of the UE, a configuration of the MR-DC handover is based at least in part on a direct forwarding path between the selected target SN and the source RAN node.

Process 600 may include additional aspects, such as any single aspect or any combination of aspects described below and/or in connection with one or more other processes described elsewhere herein.

In a first aspect, when the source RAN node is the selected target SN, performing the MR-DC handover further comprises performing the MR-DC handover without configuring or performing data forwarding between the source RAN node and the MN.

In a second aspect, alone or in combination with the first aspect, the source RAN node is associated with a first core network and the MN is associated with a second core network different than the first core network.

In a third aspect, alone or in combination with one or more of the first and second aspects, the first core network is a 5G core network and the second core network is an evolved packet core.

In a fourth aspect, alone or in combination with one or more of the first through third aspects, the handover information is included in a handover request, and the handover information is received from the source RAN node via a core network device.

In a fifth aspect, alone or in combination with one or more of the first through fourth aspects, selecting the selected target SN further comprises selecting the source RAN node as the selected target SN.

In a sixth aspect, alone or in combination with one or more of the first through fifth aspects, process 600 includes requesting, from the selected target SN, at least one of information indicating whether there is a direct forwarding path between the selected target SN and the source RAN node, or one or more identifiers associated with the direct forwarding path.

In a seventh aspect, alone or in combination with one or more of the first through sixth aspects, process 600 includes receiving, from the selected target SN when there is a direct forwarding path between the selected target SN and the source RAN node, the one or more identifiers.

In an eighth aspect, alone or in combination with one or more of the first through seventh aspects, the handover information indicates a set of SNs associated with direct forwarding paths with the source RAN node, the selected target SN is selected from the set of SNs, and the one or more candidate target SNs include one or more radio access network nodes associated with cells that are candidate target primary secondary cells or special cells a secondary cell group associated with the selected target SN.

In a ninth aspect, alone or in combination with one or more of the first through eighth aspects, selecting the source RAN node or another node as the target SN further comprises selecting the target SN based at least in part on at least one of UE measurement information or the set of SNs, and the method further comprises requesting, from the selected target SN, at least one of information indicating whether there is a direct forwarding path between the selected target SN and the source RAN node, or one or more identifiers associated with the direct forwarding path.

In a tenth aspect, alone or in combination with one or more of the first through ninth aspects, process 600 includes providing, to the selected target SN in connection with an interface setup procedure with the selected target SN, information indicating a set of RAN nodes associated with direct forwarding paths with the MN; and receiving, from the selected target SN in connection with the interface setup procedure, information indicating a set of RAN nodes associated with direct forwarding paths with the selected target SN, wherein the selected target SN is selected for the MR-DC handover based at least in part on the source RAN node being included in the set of nodes associated with direct forwarding paths with the selected target SN.

In an eleventh aspect, alone or in combination with one or more of the first through tenth aspects, the MR-DC handover comprises an EN-DC handover.

In a twelfth aspect, alone or in combination with one or more of the first through eleventh aspects, the handover information includes information indicating an evolved packet system fallback of an IMS voice call, and selecting the source RAN node or the other node as the target SN is based at least in part on the information indicating the evolved packet system fallback of the IMS voice call.

In a thirteenth aspect, alone or in combination with one or more of the first through twelfth aspects, the handover information indicates that the target SN is a source RAN node of the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
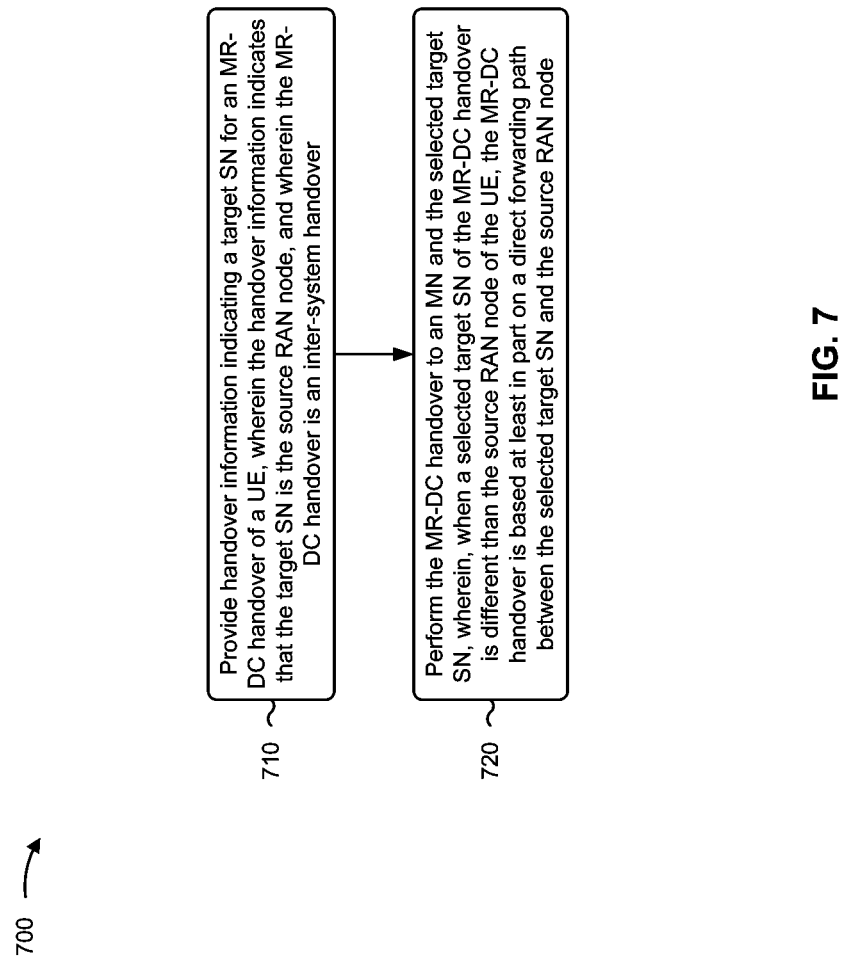
FIG. 7 is a diagram illustrating an example process performed, for example, by a source RAN node, in accordance with various aspects of the present disclosure.

FIG. 7 is a diagram illustrating an example process 700 performed, for example, by a source RAN node, in accordance with various aspects of the present disclosure. Example process 700 is an example where the source RAN node (e.g., BS 110, the source NG-RAN node of FIGS. 3-5, and/or the like) performs operations associated with an inter-system MR-DC handover.

As shown in FIG. 7, in some aspects, process 700 may include providing handover information indicating a target SN for a MR-DC handover of a UE, wherein the handover information indicates that the target SN is the source RAN node, and wherein the MR-DC handover is an inter-system handover (block 710). For example, source RAN node (e.g., using controller/processor 240, TX MIMO processor 230, MOD 232, antenna 234, and/or the like) may provide handover information indicating a target SN for a MR-DC handover of a UE, as described above. In some aspects, the handover information indicates that the target SN is the source RAN node. In some aspects, the MR-DC handover is an inter-system handover.

As further shown in FIG. 7, in some aspects, process 700 may include performing the MR-DC handover to a MN and the selected target SN, wherein, when a selected target SN of the MR-DC handover is different than the source RAN node of the UE, the MR-DC handover is based at least in part on a direct forwarding path between the selected target SN and the source RAN node (block 720). For example, the source RAN node (e.g., using controller/processor 240, transmit processor 220, TX MIMO processor 230, MOD 232, antenna 234, and/or the like) may perform the MR-DC handover to a MN and the selected target SN, as described above. In some aspects, when a selected target SN of the MR-DC handover is different than the source RAN node of the UE, the MR-DC handover is based at least in part on a direct forwarding path between the selected target SN and the source RAN node.

Process 700 may include additional aspects, such as any single aspect or any combination of aspects described below and/or in connection with one or more other processes described elsewhere herein.

In a first aspect, the source RAN node is associated with a first core network and the MN is associated with a second core network different than the first core network.

In a second aspect, alone or in combination with the first aspect, the first core network is a 5G core network and the second core network is an evolved packet core.

In a third aspect, alone or in combination with one or more of the first and second aspects, the handover information is included in a handover required message transmitted to a core network device, and the handover information is provided to the MN via the core network device.

In a fourth aspect, alone or in combination with one or more of the first through third aspects, the source RAN node is the selected target SN.

In a fifth aspect, alone or in combination with one or more of the first through fourth aspects, the handover information indicates a set of SNs associated with direct forwarding paths with the source RAN node, and the source RAN node determines the set of SNs based at least in part on a UE measurement and based at least in part on a set of nodes associated with cells that are candidate target PSCells or special cells of a secondary cell group associated with the selected target SN.

In a sixth aspect, alone or in combination with one or more of the first through fifth aspects, the MR-DC handover comprises an EN-DC handover.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
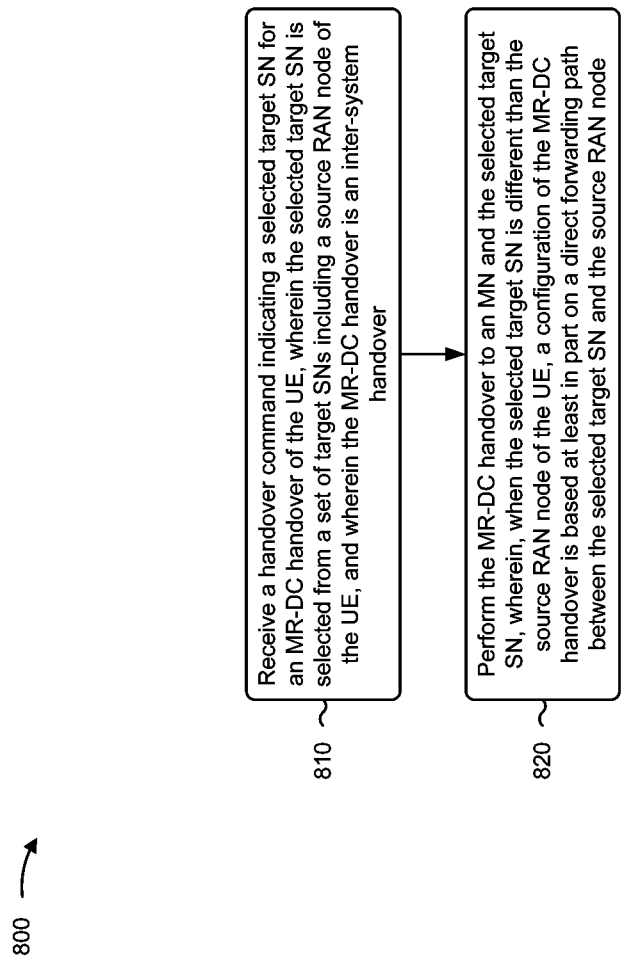
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with an inter-system MR-DC handover.

As shown in FIG. 8, in some aspects, process 800 may include receiving a handover command indicating a selected target SN for a MR-DC handover of the UE, wherein the selected target SN is selected from a set of target SNs including a source RAN node of the UE, and wherein the MR-DC handover is an inter-system handover (block 810). For example, the UE (e.g., using antenna 252, DEMOD 254, MIMO detector 256, receive processor 258, controller/processor 280, and/or the like) may receive a handover command indicating a selected target SN for a MR-DC handover of the UE, as described above. In some aspects, the selected target SN is selected from a set of target SNs including a source RAN node of the UE. In some aspects, the MR-DC handover is an inter-system handover.

As further shown in FIG. 8, in some aspects, process 800 may include performing the MR-DC handover to a MN and the selected target SN, wherein, when the selected target SN is different than the source RAN node of the UE, a configuration of the MR-DC handover is based at least in part on a direct forwarding path between the selected target SN and the source RAN node (block 820). For example, the UE (e.g., using antenna 252, DEMOD 254, MIMO detector 256, receive processor 258, controller/processor 280, and/or the like) may perform the MR-DC handover to a MN and the selected target SN, as described above. In some aspects, when the selected target SN is different than the source RAN node of the UE, a configuration of the MR-DC handover is based at least in part on a direct forwarding path between the selected target SN and the source RAN node.

Process 800 may include additional aspects, such as any single aspect or any combination of aspects described below and/or in connection with one or more other processes described elsewhere herein.

In a first aspect, when the source RAN node is the selected target SN, the MR-DC handover is performed without configuring or performing data forwarding between the source RAN node and the MN.

In a second aspect, alone or in combination with the first aspect, the source RAN node is associated with a first core network and the MN is associated with a second core network different than the first core network.

In a third aspect, alone or in combination with one or more of the first and second aspects, the first core network is a 5G core network and the second core network is an evolved packet core.

In a fourth aspect, alone or in combination with one or more of the first through third aspects, the source RAN node is the selected target SN.

In a fifth aspect, alone or in combination with one or more of the first through fourth aspects, the MR-DC handover comprises an EN-DC handover.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
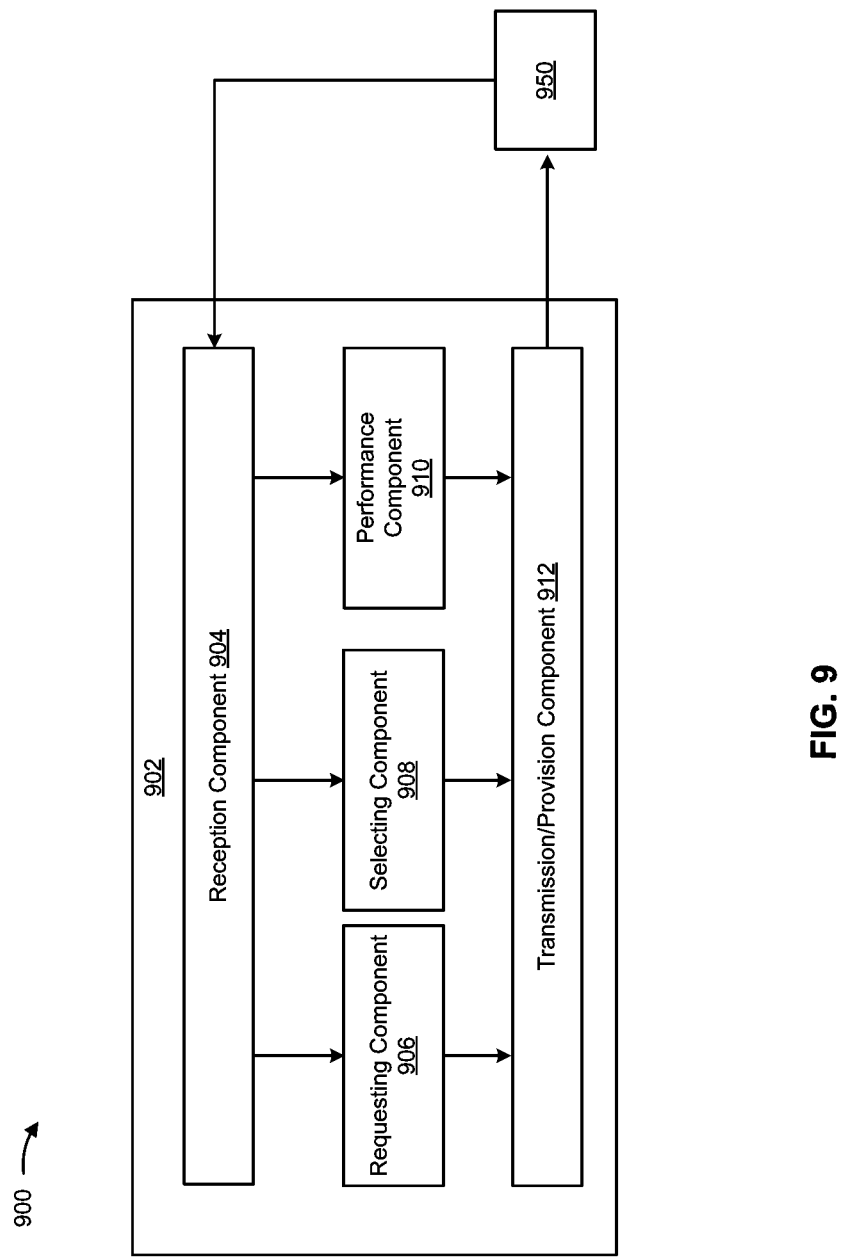
FIG. 9 is a data flow diagram illustrating the data flow between different components in an example apparatus, in accordance with various aspects of the present disclosure.

FIG. 9 is a conceptual data flow diagram 900 illustrating the data flow between different components in an example apparatus 902. The apparatus 902 may be an MN. In some aspects, the apparatus 902 includes a reception component 904, a requesting component 906, a selecting component 908, a performance component 910, and/or a transmission/provision component 912.

The reception component 904 may receive information indicating one or more candidate target SNs for an MR-DC handover of a UE 950, one or more identifiers associated with a direct forwarding path between the selected target SN and the source RAN node, information indicating a set of RAN nodes associated with direct forwarding paths with the selected target SN, and/or the like.

The requesting component 906 may request information indicating whether there is a direct forwarding path between the selected target SN and the source RAN node, one or more identifiers associated with the direct forwarding path between the selected target SN and the source RAN node, or the like.

The selecting component 908 may select the target SN based at least in part on the handover information.

The performance component 910 may perform the MR-DC handover of the UE 950.

The transmission/provision component 912 may provide, to the selected target SN in connection with an interface setup procedure with the selected target SN, information indicating a set of RAN nodes associated with direct forwarding paths with the MN.

The apparatus may include additional components that perform each of the blocks of the algorithm in the aforementioned process 600 of FIG. 6 and/or the like. Each block in the aforementioned process 600 of FIG. 6 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

Figure 10:
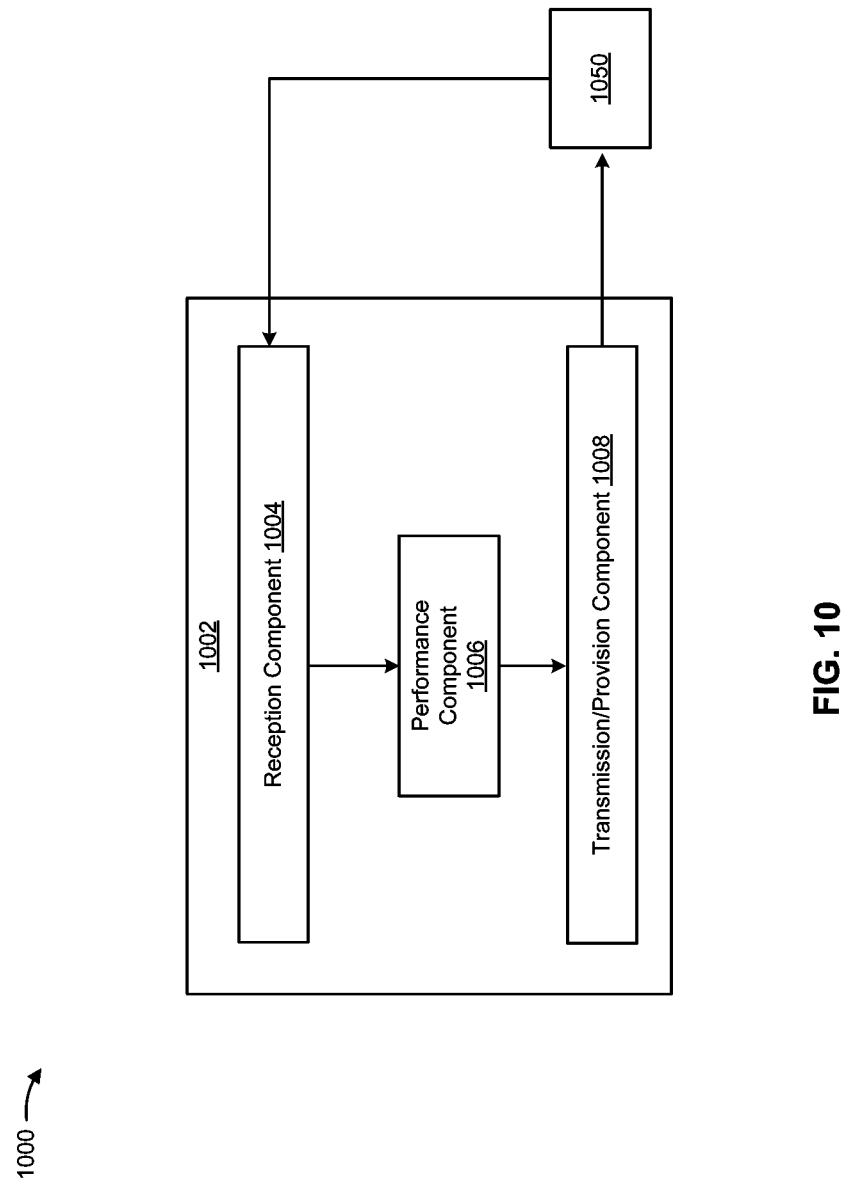
FIG. 10 is a data flow diagram illustrating the data flow between different components in an example apparatus, in accordance with various aspects of the present disclosure.

FIG. 10 is a conceptual data flow diagram 1000 illustrating the data flow between different components in an example apparatus 1002. The apparatus 1002 may be a source RAN node. In some aspects, the apparatus 1002 includes a reception component 1004, a performance component 1006, and/or a transmission/provision component 1008.

The reception component 1004 may receive information from one or more other devices regarding an MR-DC handover, such as a UE 1050 associated with the apparatus 1002, an MN associated with the MR-DC handover, and/or the like. The performance component 1006 may perform the MR-DC handover to a master node (MN) and the selected target SN. The transmission/provision component 1008 may provide information indicating one or more candidate target SNs for a MR-DC handover of a UE.

The apparatus may include additional components that perform each of the blocks of the algorithm in the aforementioned process 700 of FIG. 7 and/or the like. Each block in the aforementioned process 700 of FIG. 7 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of components (e.g., one or more components) shown in FIG. 10 may perform one or more functions described as being performed by another set of components shown in FIG. 10.

Figure 11:
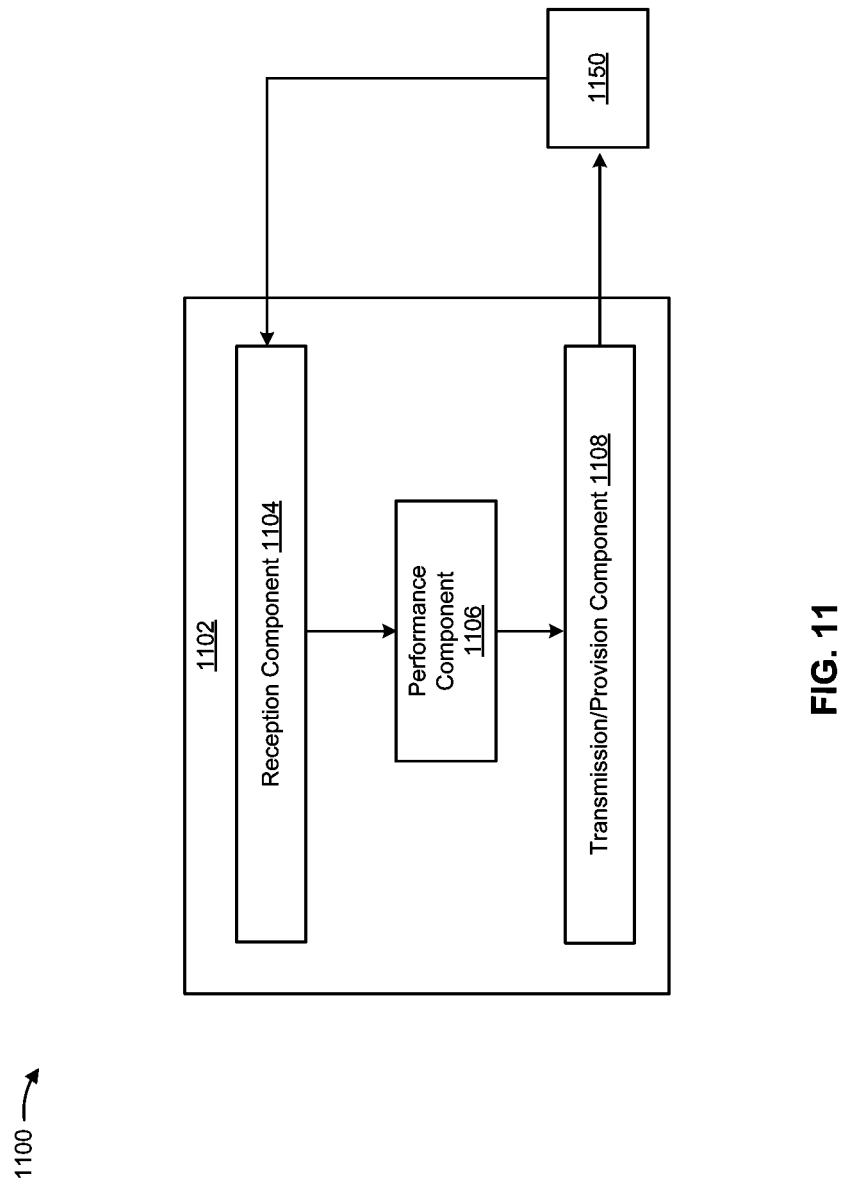
FIG. 11 is a data flow diagram illustrating the data flow between different components in an example apparatus, in accordance with various aspects of the present disclosure.

FIG. 11 is a conceptual data flow diagram 1100 illustrating the data flow between different components in an example apparatus 1102. The apparatus 1102 may be a UE. In some aspects, the apparatus 1102 includes a reception component 1104, a performance component 1106, and/or a transmission/provision 1108.

The reception component 1104 may receive a handover command indicating a selected target SN for a MR-DC handover of the UE, wherein the selected target SN is selected from a set of candidate target SNs including a source RAN node of the UE, and wherein the MR-DC handover is an inter-system handover. The performance component 1106 may perform the MR-DC handover to an MN 1150 and the selected target SN, wherein, when the selected target SN is different than the source RAN node of the UE, a configuration of the MR-DC handover is based at least in part on a direct forwarding path between the selected target SN and the source RAN node. The transmission/provision component 1108 may transmit or provide information in association with the MR-DC handover, such as measurement information to the source RAN node and/or the like.

The apparatus may include additional components that perform each of the blocks of the algorithm in the aforementioned process 800 of FIG. 8 and/or the like. Each block in the aforementioned process 800 of FIG. 8 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of components (e.g., one or more components) shown in FIG. 11 may perform one or more functions described as being performed by another set of components shown in FIG. 11.

Figure 12:
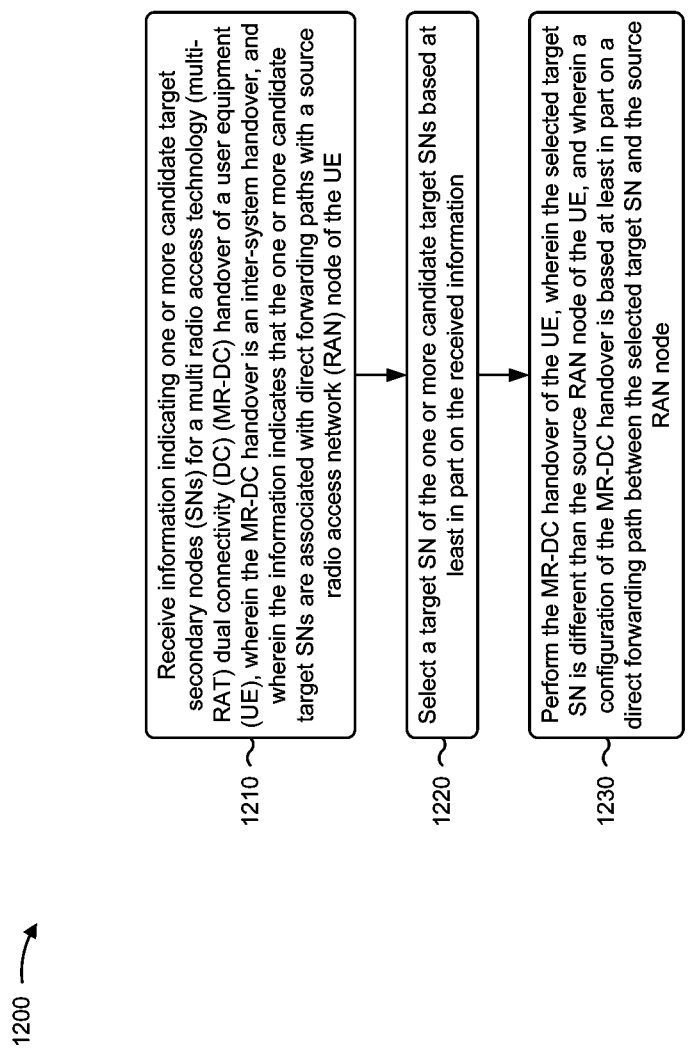
FIG. 12 is a diagram illustrating an example process performed, for example, by a MN, in accordance with various aspects of the present disclosure.

FIG. 12 is a diagram illustrating an example process 1200 performed, for example, by an master node (MN), in accordance with various aspects of the present disclosure. Example process 1200 is an example where the MN (e.g., BS 110, the MeNB, and the MN described in connection with FIGS. 3-5, the MN of FIG. 6, the apparatus 902, and/or the like) performs operations associated with inter-system handing over from a standalone to a non-standalone mode.

As shown in FIG. 12, in some aspects, process 1200 may include receiving information indicating one or more candidate target SNs for an MR-DC handover of a UE, wherein the MR-DC handover is an inter-system handover, and wherein the information indicates that the one or more candidate target SNs are associated with direct forwarding paths with a source RAN node of the UE (block 1210). For example, the MN (e.g., using reception component 904, depicted in FIG. 9) may receive information indicating one or more candidate target SNs for an MR-DC handover of a UE, wherein the MR-DC handover is an inter-system handover, and wherein the information indicates that the one or more candidate target SNs are associated with direct forwarding paths with a source RAN node of the UE. In some aspects, the received information may be conveyed via handover information, such as a handover required message or a handover request. In some aspects, the received information may be conveyed as part of an SN addition procedure, such as via an SN addition request acknowledge message.

As further shown in FIG. 12, in some aspects, process 1200 may include selecting a target SN from the one or more candidate target SNs based at least in part on the received information (block 1220). For example, the MN (e.g., using selecting component 908, depicted in FIG. 9) may select a target SN from the one or more candidate target SNs based at least in part on the received information, as described above. In some aspects, the MN may select the target SN based at least in part on the target SN being associated with a direct forwarding path with the source RAN node.

As further shown in FIG. 12, in some aspects, process 1200 may include performing the MR-DC handover of the UE, wherein the selected target SN is different than the source RAN node of the UE, and wherein a configuration of the MR-DC handover is based at least in part on a direct forwarding path between the selected target SN and the source RAN node (block 1230). For example, the MN (e.g., using performance component 910, depicted in FIG. 9) may perform the MR-DC handover of the UE, wherein the selected target SN is different than the source RAN node of the UE, and wherein a configuration of the MR-DC handover is based at least in part on a direct forwarding path between the selected target SN and the source RAN node, as described above.

Process 1200 may include additional aspects, such as any single aspect or any combination of aspects described below and/or in connection with one or more other processes described elsewhere herein.

In a first aspect, process 1200 includes requesting, from the selected target SN, at least one of information indicating whether there is a direct forwarding path between the selected target SN and the source RAN node, or one or more identifiers associated with the direct forwarding path.

In a second aspect, alone or in combination with the first aspect, process 1200 includes receiving, from the selected target SN when there is a direct forwarding path between the selected target SN and the source RAN node, at least one of the one or more identifiers or the information indicating whether there is a direct forwarding path between the selected target SN and the source RAN node.

In a third aspect, alone or in combination with one or more of the first and second aspects, process 1200 includes forwarding at least one of the one or more identifiers to the source NG-RAN node.

In a fourth aspect, alone or in combination with one or more of the first through third aspects, the information indicating the one or more candidate target SNs is received with the one or more identifiers or the information indicating whether there is a direct forwarding path between the selected target SN and the source RAN node.

In a fifth aspect, alone or in combination with one or more of the first through fourth aspects, the one or more candidate target SNs include one or more radio access network nodes associated with cells that are candidate target primary cells of a secondary cell group associated with the selected target SN.

In a sixth aspect, alone or in combination with one or more of the first through fifth aspects, selecting the target SN further comprises selecting the target SN based at least in part on at least one of UE measurement information or the one or more candidate target SNs, and wherein the method further comprises requesting, from the selected target SN, at least one of information indicating whether there is a direct forwarding path between the selected target SN and the source RAN node, or one or more identifiers associated with the direct forwarding path, and receiving, from the selected target SN when there is a direct forwarding path between the selected target SN and the source RAN node, the one or more identifiers.

In a seventh aspect, alone or in combination with one or more of the first through sixth aspects, the source RAN node is associated with a first core network and wherein the MN is associated with a second core network different than the first core network.

In an eighth aspect, alone or in combination with one or more of the first through seventh aspects, the first core network is a 5G core network and the second core network is an evolved packet core.

In a ninth aspect, alone or in combination with one or more of the first through eighth aspects, the received information is received in a handover required message.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
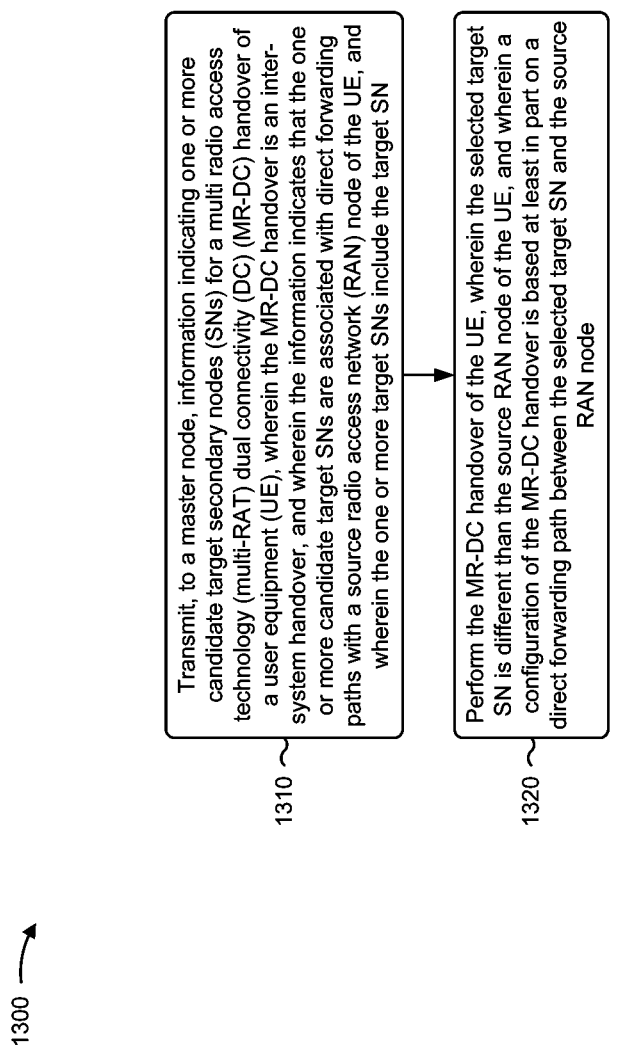
FIG. 13 is a diagram illustrating an example process performed, for example, by a target secondary node, in accordance with various aspects of the present disclosure.

FIG. 13 is a diagram illustrating an example process 1300 performed, for example, by a target SN, in accordance with various aspects of the present disclosure. Example process 1300 is an example where the SN (e.g., BS 110, the SgNB described in connection with FIGS. 3-5, or the like) performs operations associated with techniques for inter-system handing over from a standalone to a non-standalone mode.

As shown in FIG. 13, in some aspects, process 1300 may include transmitting, to an MN, information indicating one or more candidate target SNs for an MR-DC handover of a UE, wherein the MR-DC handover is an inter-system handover, wherein the information indicates that the one or more candidate target SNs are associated with direct forwarding paths with a source RAN node of the UE, and wherein the one or more candidate target SNs include the target SN (block 1310). For example, the SN (e.g., using transmission component 1504, depicted in FIG. 15) may transmitting, to an MN, information indicating one or more candidate target SNs for an MR-DC handover of a UE, wherein the MR-DC handover is an inter-system handover, wherein the information indicates that the one or more candidate target SNs are associated with direct forwarding paths with a source RAN node of the UE, and wherein the one or more candidate target SNs include the target SN, as described above. In some aspects, the information may be transmitted as part of an SN addition procedure for which the target SN is a selected target SN. For example, the information may be transmitted as part of an SN addition message, such as an SN addition request acknowledge message. In other aspects described herein, the information is transmitted by another device, such as the source RAN node.

As further shown in FIG. 13, in some aspects, process 1300 may include performing the MR-DC handover of the UE, wherein the selected target SN is selected for the MR-DC handover and is different than the source RAN node of the UE, and wherein a configuration of the MR-DC handover is based at least in part on a direct forwarding path between the selected target SN and the source RAN node (block 1320). For example, the SN (e.g., using handover component 1508, depicted in FIG. 15) may perform the MR-DC handover of the UE, wherein the selected target SN is selected for the MR-DC handover and is different than the source RAN node of the UE, and wherein a configuration of the MR-DC handover is based at least in part on a direct forwarding path between the selected target SN and the source RAN node, as described above. In other aspects described herein, the MR-DC handover of the UE is performed by another device, such as the source RAN node.

Process 1300 may include additional aspects, such as any single aspect or any combination of aspects described below and/or in connection with one or more other processes described elsewhere herein.

In a first aspect, process 1300 includes receiving a request for at least one of information indicating whether there is a direct forwarding path between the selected target SN and the source RAN node, or one or more identifiers associated with the direct forwarding path.

In a second aspect, alone or in combination with the first aspect, process 1300 includes transmitting, based at least in part on the request and there being a direct forwarding path between the selected target SN and the source RAN node, at least one of the one or more identifiers or the information indicating whether there is a direct forwarding path between the selected target SN and the source RAN node.

In a third aspect, alone or in combination with one or more of the first and second aspects, the information indicating the one or more candidate target SNs is transmitted with the one or more identifiers or the information indicating whether there is a direct forwarding path between the selected target SN and the source RAN node.

In a fourth aspect, alone or in combination with one or more of the first through third aspects, the one or more candidate target SNs include one or more radio access network nodes associated with cells that are candidate target primary cells of a secondary cell group associated with the selected target SN.

In a fifth aspect, alone or in combination with one or more of the first through fourth aspects, the source RAN node is associated with a first core network and wherein the MN is associated with a second core network different than the first core network.

In a sixth aspect, alone or in combination with one or more of the first through fifth aspects, the first core network is a 5G core network and the second core network is an evolved packet core.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
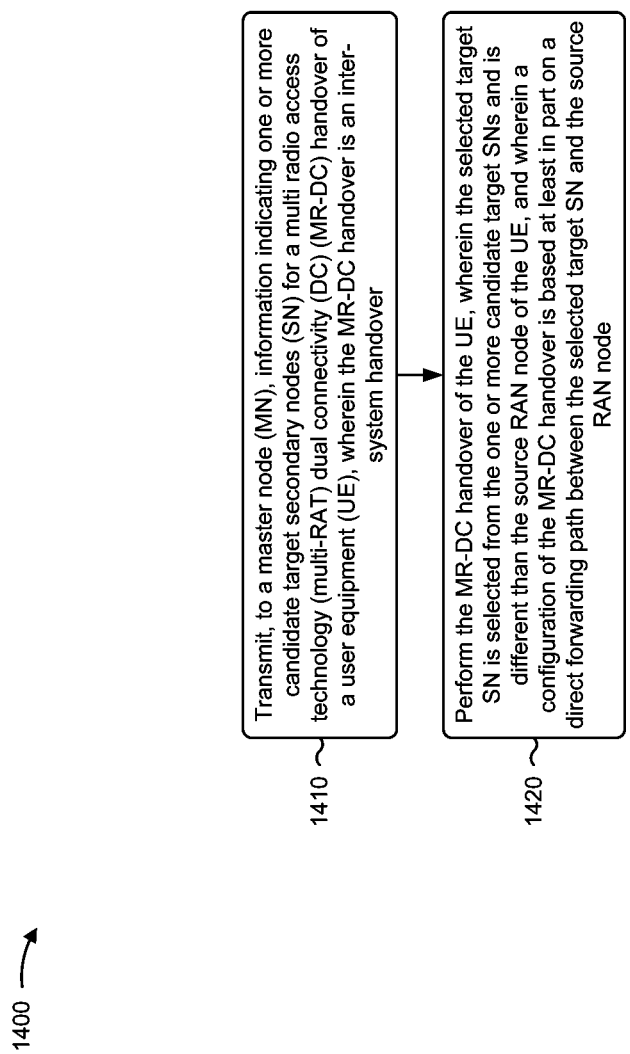
FIG. 14 is a diagram illustrating an example process performed, for example, by a source RAN node, in accordance with various aspects of the present disclosure.

FIG. 14 is a diagram illustrating an example process 1400 performed, for example, by a source RAN node, in accordance with various aspects of the present disclosure. Example process 1400 is an example where the source RAN node (e.g., BS 110, the source NG-RAN node of FIGS. 3-5, and/or the like) performs operations associated with inter-system handing over from a standalone to a non-standalone mode.

As shown in FIG. 14, in some aspects, process 1400 may include transmitting, to a master node (MN), information indicating one or more target secondary nodes (SN) for a multi radio access technology (multi-RAT) dual connectivity (DC) (MR-DC) handover of a user equipment (UE), wherein the MR-DC handover is an inter-system handover (block 1410). For example, the RAN (e.g., using transmission/provision component 1008, depicted in FIG. 10) may transmit, to an MN, information indicating one or more candidate target SNs for an MR-DC handover of a UE, wherein the MR-DC handover is an inter-system handover, as described above.

As further shown in FIG. 14, in some aspects, process 1400 may include performing the MR-DC handover of the UE, wherein the selected target SN is selected from the one or more candidate target SNs and is different than the source RAN node of the UE, and wherein a configuration of the MR-DC handover is based at least in part on a direct forwarding path between the selected target SN and the source RAN node (block 1420). For example, the source RAN node (e.g., using performing component 1006, depicted in FIG. 10) may perform the MR-DC handover of the UE, wherein the selected target SN is different than the source RAN node of the UE, and wherein a configuration of the MR-DC handover is based at least in part on a direct forwarding path between the selected target SN and the source RAN node, as described above. In other aspects described herein, the MR-DC handover of the UE is performed by another device, such as the selected target SN.

Process 1400 may include additional aspects, such as any single aspect or any combination of aspects described below and/or in connection with one or more other processes described elsewhere herein.

In a first aspect, process 1400 includes receiving, from the selected target SN via the MN, one or more identifiers associated with the direct forwarding path if there is a direct forwarding path from the selected target SN.

In a second aspect, alone or in combination with the first aspect, the one or more candidate target SNs include one or more radio access network nodes associated with cells that are candidate target primary cells of a secondary cell group associated with the selected target SN.

In a third aspect, alone or in combination with one or more of the first and second aspects, the source RAN node is associated with a first core network and wherein the MN is associated with a second core network different than the first core network.

In a fourth aspect, alone or in combination with one or more of the first through third aspects, the first core network is a 5G core network and the second core network is an evolved packet core.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

FIG. 15 is a block diagram of an example apparatus 1500 for wireless communication. The apparatus 1500 may be an SN (e.g., a target SN of an MR-DC handover), or an SN may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a handover component 1508, among other examples.

In some aspects, the apparatus 1500 may be configured to perform one or more operations described herein in connection with FIGS. 3-5. Additionally, or alternatively, the apparatus 1500 may be configured to perform one or more processes described herein, such as process 1300 of FIG. 13, or a combination thereof. In some aspects, the apparatus 1500 and/or one or more components shown in FIG. 15 may include one or more components of the target SN described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the target SN described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the target SN described above in connection with FIG. 2. In some aspects, the transmission component 1504 may be co-located with the reception component 1502 in a transceiver.

The transmission component 1504 may transmit, to a master node, information indicating one or more candidate target secondary nodes (SNs) for a multi radio access technology (multi-RAT) dual connectivity (DC) (MR-DC) handover of a user equipment (UE), wherein the MR-DC handover is an inter-system handover, and wherein the information indicates that the one or more candidate target SNs are associated with direct forwarding paths with a source radio access network (RAN) node of the UE, and wherein the one or more candidate target SNs include the target SN. The handover component 1508 may perform the MR-DC handover of the UE, wherein the selected target SN is different than the source RAN node of the UE, and wherein a configuration of the MR-DC handover is based at least in part on a direct forwarding path between the selected target SN and the source RAN node.

The reception component 1502 may receive a request for at least one of information indicating whether there is a direct forwarding path between the selected target SN and the source RAN node, or one or more identifiers associated with the direct forwarding path.

The transmission component 1504 may transmit, based at least in part on the request and there being a direct forwarding path between the selected target SN and the source RAN node, at least one of the one or more identifiers or the information indicating whether there is a direct forwarding path between the selected target SN and the source RAN node.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some aspects of the present disclosure:

Aspect 1: A method of wireless communication performed by a master node (MN), comprising: receiving handover information indicating a target secondary node (SN) for a multi radio access technology (multi-RAT) dual connectivity (DC) (MR-DC) handover of a user equipment (UE), wherein the handover information indicates that the target SN is a source radio access network (RAN) node of the UE, and wherein the MR-DC handover is an inter-system handover; selecting the source RAN node or another node as the target SN based at least in part on the handover information; and performing the MR-DC handover of the UE, wherein, when the selected target SN is different than the source RAN node of the UE, a configuration of the MR-DC handover is based at least in part on a direct forwarding path between the selected target SN and the source RAN node.

Aspect 2: The method of aspect 1, wherein, when the source RAN node is the selected target SN, performing the MR-DC handover further comprises: performing the MR-DC handover without configuring or performing data forwarding between the source RAN node and the MN.

Aspect 3: The method of any of aspects 1-2, wherein the source RAN node is associated with a first core network and wherein the MN is associated with a second core network different than the first core network.

Aspect 4: The method of aspect 3, wherein the first core network is a 5G core network and the second core network is an evolved packet core.

Aspect 5: The method of any of aspects 1-4, wherein the handover information is included in a handover request, and wherein the handover information is received from the source RAN node via a core network device.

Aspect 6: The method of any of aspects 1-5, wherein selecting the selected target SN further comprises selecting the source RAN node as the selected target SN.

Aspect 7: The method of any of aspects 1-6, further comprising: requesting, from the selected target SN, at least one of information indicating whether there is a direct forwarding path between the selected target SN and the source RAN node, or one or more identifiers associated with the direct forwarding path.

Aspect 8: The method of aspect 7, further comprising: receiving, from the selected target SN when there is a direct forwarding path between the selected target SN and the source RAN node, the one or more identifiers.

Aspect 9: The method of any of aspects 1-8, wherein the handover information indicates a set of SNs associated with direct forwarding paths with the source RAN node, wherein the selected target SN is selected from the set of SNs, and wherein the one or more candidate target SNs include one or more radio access network nodes associated with cells that are candidate target primary cells of a secondary cell group associated with the selected target SN.

Aspect 10: The method of aspect 9, wherein selecting the source RAN node or another node as the target SN further comprises selecting the target SN based at least in part on at least one of UE measurement information or the set of SNs, and wherein the method further comprises: requesting, from the selected target SN, at least one of information indicating whether there is a direct forwarding path between the selected target SN and the source RAN node, or one or more identifiers associated with the direct forwarding path; and receiving, from the selected target SN when there is a direct forwarding path between the selected target SN and the source RAN node, the one or more identifiers.

Aspect 11: The method of any of aspects 1-10, further comprising: providing, to the selected target SN in connection with an interface setup procedure with the selected target SN, information indicating a set of radio access network (RAN) nodes associated with direct forwarding paths with the MN; and receiving, from the selected target SN in connection with the interface setup procedure, information indicating a set of RAN nodes associated with direct forwarding paths with the selected target SN, wherein the selected target SN is selected for the MR-DC handover based at least in part on the source RAN node being included in the set of nodes associated with direct forwarding paths with the selected target SN.

Aspect 12: The method of any of aspects 1-11, wherein the MR-DC handover comprises an Evolved Universal Mobile Telecommunications Service Terrestrial Radio Access New Radio DC (EN-DC) handover.

Aspect 13: A method of wireless communication performed by a source radio access network (RAN) node, comprising: providing handover information indicating a target secondary node (SN) for a multi radio access technology (multi-RAT) dual connectivity (DC) (MR-DC) handover of a user equipment (UE), wherein the handover information indicates that the target SN is the source RAN node, and wherein the MR-DC handover is an inter-system handover; and performing the MR-DC handover to a master node (MN) and the selected target SN, wherein, when a selected target SN of the MR-DC handover is different than the source RAN node of the UE, the MR-DC handover is based at least in part on a direct forwarding path between the selected target SN and the source RAN node.

Aspect 14: The method of aspect 13, wherein the source RAN node is associated with a first core network and wherein the MN is associated with a second core network different than the first core network.

Aspect 15: The method of aspect 14, wherein the first core network is a 5G core network and the second core network is an evolved packet core.

Aspect 16: The method of any of aspects 13-15, wherein the handover information is included in a handover required message transmitted to a core network device, and wherein the handover information is provided to the MN via the core network device.

Aspect 17: The method of any of aspects 13-16, wherein the source RAN node is the selected target SN.

Aspect 18: The method of any of aspects 13-17, wherein the handover information indicates a set of SNs associated with direct forwarding paths with the source RAN node, and wherein the source RAN node determines the set of SNs based at least in part on a UE measurement and based at least in part on a set of nodes associated with cells that are candidate target primary cells of a secondary cell group associated with the selected target SN.

Aspect 19: The method of any of aspects 13-18, wherein the MR-DC handover comprises an Evolved Universal Mobile Telecommunications Service Terrestrial Radio Access New Radio DC (EN-DC) handover.

Aspect 20: A method of wireless communication performed by a user equipment (UE), comprising: receiving a handover command indicating a selected target secondary node (SN) for a multi radio access technology (multi-RAT) dual connectivity (DC) (MR-DC) handover of the UE, wherein the selected target SN is selected from a set of target SNs including a source radio access network (RAN) node of the UE, and wherein the MR-DC handover is an inter-system handover; and performing the MR-DC handover to a master node (MN) and the selected target SN, wherein, when the selected target SN is different than the source RAN node of the UE, a configuration of the MR-DC handover is based at least in part on a direct forwarding path between the selected target SN and the source RAN node.

Aspect 21: The method of aspect 20, wherein, when the source RAN node is the selected target SN, the MR-DC handover is performed without configuring or performing data forwarding between the source RAN node and the MN.

Aspect 22: The method of any of aspects 20-21, wherein the source RAN node is associated with a first core network and wherein the MN is associated with a second core network different than the first core network.

Aspect 23: The method of aspect 22, wherein the first core network is a 5G core network and the second core network is an evolved packet core.

Aspect 24: The method of any of aspects 20-23, wherein the source RAN node is the selected target SN.

Aspect 25: The method of any of aspects 20-24, wherein the MR-DC handover comprises an Evolved Universal Mobile Telecommunications Service Terrestrial Radio Access New Radio DC (EN-DC) handover.

Aspect 26: A method of wireless communication performed by a master node (MN), comprising: receiving handover information associated with a multi radio access technology (multi-RAT) dual connectivity (DC) (MR-DC) handover of a user equipment (UE), wherein the MR-DC handover is an inter-system handover; selecting a source radio access network (RAN) node of the UE or another node as the target SN based at least in part on the handover information; and performing the MR-DC handover of the UE, wherein, when the selected target SN is different than the source RAN node of the UE, a configuration of the MR-DC handover is based at least in part on a direct forwarding path between the selected target SN and the source RAN node.

Aspect 27: The method of aspect 26, wherein the handover information includes information indicating an evolved packet system fallback of an Internet Protocol media subsystem (IMS) voice call, and wherein selecting the source RAN node or the other node as the target SN is based at least in part on the information indicating the evolved packet system fallback of the IMS voice call.

Aspect 28: A method of wireless communication performed by a master node (MN), comprising: receiving information indicating one or more candidate target secondary nodes (SNs) for a multi radio access technology (multi-RAT) dual connectivity (DC) (MR-DC) handover of a user equipment (UE), wherein the MR-DC handover is an inter-system handover, and wherein the information indicates that the one or more candidate target SNs are associated with direct forwarding paths with a source radio access network (RAN) node of the UE; selecting a target SN from the one or more candidate target SNs based at least in part on the received information; and performing the MR-DC handover of the UE, wherein the selected target SN is different than the source RAN node of the UE, and wherein a configuration of the MR-DC handover is based at least in part on a direct forwarding path between the selected target SN and the source RAN node.

Aspect 29: The method of aspect 28, further comprising requesting, from the selected target SN, at least one of information indicating whether there is a direct forwarding path between the selected target SN and the source RAN node, or one or more identifiers associated with the direct forwarding path.

Aspect 30: The method of aspect 29, further comprising receiving, from the selected target SN when there is a direct forwarding path between the selected target SN and the source RAN node, at least one of the one or more identifiers or the information indicating whether there is a direct forwarding path between the selected target SN and the source RAN node.

Aspect 31: The method of aspect 30, further comprising forwarding at least one of the one or more identifiers to the source RAN node.

Aspect 32: The method of aspect 30, wherein the information indicating the one or more candidate target SNs is received with the one or more identifiers or the information indicating whether there is a direct forwarding path between the selected target SN and the source RAN node.

Aspect 33: The method of any of aspects 28-32, wherein the one or more candidate target SNs include one or more radio access network nodes associated with cells that are candidate target primary cells of a secondary cell group associated with the selected target SN.

Aspect 34: The method of aspect 33, wherein selecting the target SN further comprises selecting the target SN based at least in part on at least one of UE measurement information or the one or more candidate target SNs, and wherein the method further comprises requesting, from the selected target SN, at least one of information indicating whether there is a direct forwarding path between the selected target SN and the source RAN node, or one or more identifiers associated with the direct forwarding path; and receiving, from the selected target SN when there is a direct forwarding path between the selected target SN and the source RAN node, the one or more identifiers.

Aspect 35: The method of any of aspects 28-34, wherein the source RAN node is associated with a first core network and wherein the MN is associated with a second core network different than the first core network.

Aspect 36: The method of aspect 35, wherein the first core network is a 5G core network and the second core network is an evolved packet core.

Aspect 37: The method of any of aspects 28-36, wherein the received information is received in a handover required message.

Aspect 38: A method of wireless communication performed by a target secondary node (SN), comprising: transmitting, to a master node (MN), information indicating one or more candidate target secondary nodes (SN) for a multi radio access technology (multi-RAT) dual connectivity (DC) (MR-DC) handover of a user equipment (UE), wherein the MR-DC handover is an inter-system handover, and wherein the information indicates that the one or more candidate target SNs are associated with direct forwarding paths with a source radio access network (RAN) node of the UE, and wherein the one or more candidate target SNs include the target SN; and performing the MR-DC handover of the UE, wherein the target SN is selected for the MR-DC handover and is different than the source RAN node of the UE, and wherein a configuration of the MR-DC handover is based at least in part on a direct forwarding path between the selected target SN and the source RAN node.

Aspect 39: The method of aspect 38, further comprising receiving a request for at least one of information indicating whether there is a direct forwarding path between the selected target SN and the source RAN node, or one or more identifiers associated with the direct forwarding path.

Aspect 40: The method of aspect 39, further comprising transmitting, based at least in part on the request and there being a direct forwarding path between the selected target SN and the source RAN node, at least one of the one or more identifiers or the information indicating whether there is a direct forwarding path between the selected target SN and the source RAN node.

Aspect 41: The method of aspect 40, wherein the information indicating the one or more candidate target SNs is transmitted with the one or more identifiers or the information indicating whether there is a direct forwarding path between the selected target SN and the source RAN node.

Aspect 42: The method of any of aspects 38-41, wherein the one or more candidate target SNs include one or more radio access network nodes associated with cells that are candidate target primary cells of a secondary cell group associated with the selected target SN.

Aspect 43: The method of any of aspects 38-42, wherein the source RAN node is associated with a first core network and wherein the MN is associated with a second core network different than the first core network.

Aspect 44: The method of aspect 43, wherein the first core network is a 5G core network and the second core network is an evolved packet core.

Aspect 45: A method of wireless communication performed by source radio access node (RAN), comprising: transmitting, to a master node (MN), information indicating one or more candidate target secondary nodes (SN) for a multi radio access technology (multi-RAT) dual connectivity (DC) (MR-DC) handover of a user equipment (UE), wherein the MR-DC handover is an inter-system handover; and performing the MR-DC handover of the UE, wherein a selected target SN of the MR-DC handover is selected from the one or more candidate target SNs and is different than the source RAN node of the UE, and wherein a configuration of the MR-DC handover is based at least in part on a direct forwarding path between the selected target SN and the source RAN node.

Aspect 46: The method of aspect 45, further comprising receiving, from the selected target SN via the MN, one or more identifiers associated with the direct forwarding path if there is a direct forwarding path from the selected target SN.

Aspect 47: The method of any of aspects 45-46, wherein the one or more candidate target SNs include one or more radio access network nodes associated with cells that are candidate target primary cells of a secondary cell group associated with the selected target SN.

Aspect 48: The method of any of aspects 45-47, wherein the source RAN node is associated with a first core network and wherein the MN is associated with a second core network different than the first core network.

Aspect 49: The method of aspect 48, wherein the first core network is a 5G core network and the second core network is an evolved packet core.

Aspect 50: An apparatus for wireless communication at a device, comprising a processor; memory coupled with the processor; and instructions stored in the memory and executable by the processor to cause the apparatus to perform the method of one or more aspects of aspects 1-49.

Aspect 51: A device for wireless communication, comprising a memory and one or more processors coupled to the memory, the memory and the one or more processors configured to perform the method of one or more aspects of aspects 1-50.

Aspect 52: An apparatus for wireless communication, comprising at least one means for performing the method of one or more aspects of aspects 1-50.

Aspect 53: A non-transitory computer-readable medium storing code for wireless communication, the code comprising instructions executable by a processor to perform the method of one or more aspects of aspects 1-50.

Aspect 54: A non-transitory computer-readable medium storing a set of instructions for wireless communication, the set of instructions comprising one or more instructions that, when executed by one or more processors of a device, cause the device to perform the method of one or more aspects of aspects 1-50.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a master node (MN), comprising:

receiving information indicating a target secondary node (SN) for an inter-system handover of a user equipment (UE) from a New Radio (NR) standalone mode to an E-UTRA-NR dual connectivity (EN-DC) mode, wherein the information indicates that the target SN is associated with a direct forwarding path between the target SN and a source radio access network (RAN) node of the UE; and performing the inter-system handover of the UE from the source RAN node to the MN and the target SN, wherein the target SN is different than the source RAN node of the UE.

2. The method of claim 1, further comprising:
requesting, from the target SN, at least one of information indicating whether there is the direct forwarding path between the target SN and the source RAN node, or one or more identifiers associated with the direct forwarding path.

3. The method of claim 2, further comprising:
receiving, from the target SN when there is the direct forwarding path between the target SN and the source RAN node, at least one of the one or more identifiers or the information indicating whether there is the direct forwarding path between the target SN and the source RAN node.

4. The method of claim 3, wherein the information indicating the target SN is received with the one or more identifiers or the information indicating whether there is the direct forwarding path between the target SN and the source RAN node.

5. The method of claim 1, wherein the target SN is a radio access network node associated with one or more cells that are candidate target primary cells of a secondary cell group.

6. The method of claim 1, wherein the source RAN node is associated with a first core network and wherein the MN is associated with a second core network different than the first core network.

7. The method of claim 6, wherein the first core network is a 5G core network and the second core network is an evolved packet core.

8. The method of claim 1, wherein the received information is received in a secondary node addition request acknowledge message.

9. The method of claim 1, wherein a configuration of the inter-system handover is based at least in part on the direct forwarding path between the target SN and the source RAN node.

10. A method of wireless communication performed by a target secondary node (SN), comprising:
transmitting, to a master node (MN), information indicating the target SN for an inter-system handover of a user equipment (UE) from a New Radio (NR) standalone mode to an E-UTRA-NR dual connectivity (EN-DC) mode, wherein the information indicates that the target SN is associated with a direct forwarding path between the target SN and a source radio access network (RAN) node of the UE; and
performing the inter-system handover of the UE from the source RAN node to the MN and the target SN, wherein the target SN is different than the source RAN node of the UE.

11. The method of claim 10, further comprising:
receiving a request for at least one of information indicating whether there is the direct forwarding path between the target SN and the source RAN node, or one or more identifiers associated with the direct forwarding path.

12. The method of claim 11, further comprising:
transmitting, based at least in part on the request and there being the direct forwarding path between the target SN and the source RAN node, at least one of the one or more identifiers or the information indicating whether there is the direct forwarding path between the target SN and the source RAN node.

13. The method of claim 12, wherein the information indicating the target SN is transmitted with the one or more identifiers or the information indicating whether there is the direct forwarding path between the target SN and the source RAN node.

14. The method of claim 10, wherein the target SN is a radio access network node associated with one or more cells that are candidate target primary cells of a secondary cell group.

15. The method of claim 10, wherein the source RAN node is associated with a first core network and wherein the MN is associated with a second core network different than the first core network.

16. The method of claim 15, wherein the first core network is a 5G core network and the second core network is an evolved packet core.

17. The method of claim 10, wherein a configuration of the inter-system handover is based at least in part on the direct forwarding path between the target SN and the source RAN node.

18. A method of wireless communication performed by a source radio access network (RAN) node, comprising:
transmitting, to a master node (MN), information indicating a target secondary node (SN) for an inter-system handover of a user equipment (UE) from a New Radio (NR) standalone mode to an E-UTRA-NR dual connectivity (EN-DC) mode; and
performing the inter-system handover of the UE from the source RAN node to the MN and the target SN, wherein the target SN is different than the source RAN node of the UE.

19. The method of claim 18, further comprising:
receiving, from the target SN via the MN, one or more identifiers associated with a direct forwarding path between the target SN and the source RAN node if there is the direct forwarding path between the target SN and the source RAN node.

20. The method of claim 18, wherein the target SN is a radio access network node associated with one or more cells that are candidate target primary cells of a secondary cell group.

21. The method of claim 18, wherein the source RAN node is associated with a first core network and wherein the MN is associated with a second core network different than the first core network.

22. The method of claim 21, wherein the first core network is a 5G core network and the second core network is an evolved packet core.

23. A master node (MN) for wireless communication, comprising:
a memory; and
one or more processors operatively coupled to the memory, the memory and the one or more processors configured to:
receive information indicating a target secondary node (SN) for an inter-system handover of a user equipment (UE) from a New Radio (NR) standalone mode to an E-UTRA-NR dual connectivity (EN-DC) mode, wherein the information indicates that the target SN is associated with a direct forwarding path between the target SN and a source radio access network (RAN) node of the UE; and perform the inter-system handover of the UE from the source RAN node to the MN and the target SN, wherein the target SN is different than the source RAN node of the UE.

24. The MN of claim 23, wherein the one or more processors are further configured to:

request, from the target SN, at least one of information indicating whether there is the direct forwarding path between the target SN and the source RAN node, or one or more identifiers associated with the direct forwarding path.

25. The MN of claim 24, wherein the one or more processors are further configured to:

receive, from the target SN when there is the direct forwarding path between the target SN and the source RAN node, at least one of the one or more identifiers or the information indicating whether there is the direct forwarding path between the target SN and the source RAN node.

26. The MN of claim 25, wherein the one or more processors are further configured to:

forward at least one of the one or more identifiers to the source RAN node.

27. The MN of claim 25, wherein the information indicating the target SN is received with the one or more identifiers or the information indicating whether there is the direct forwarding path between the target SN and the source RAN node.

28. The MN of claim 23, wherein the target SN is a radio access network node associated with one or more cells that are candidate target primary cells of a secondary cell group.

29. The MN of claim 23, wherein the source RAN node is associated with a first core network and wherein the MN is associated with a second core network different than the first core network.

30. The MN of claim 23, wherein a configuration of the inter-system handover is based at least in part on the direct forwarding path between the target SN and the source RAN node.

31. The MN of claim 23, wherein the received information is received in a secondary node addition request acknowledge message.

* * * * *